(12) United States Patent  
Forstall et al.

(10) Patent No.: US 9,104,294 B2  
(45) Date of Patent: Aug. 11, 2015

(54) LINKED WIDGETS

(75) Inventors: Scott Forstall, Mountain View, CA (US); Imran A. Chaudhri, San Francisco, CA (US); John O. Louch, San Luis Obispo, CA (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 920 days.

(21) Appl. No.: 11/403,644

(22) Filed: Apr. 12, 2006

(65) Prior Publication Data

US 2007/0101291 A1    May 3, 2007

(51) Int. Cl.
*G06F 3/00* (2006.01)
*G06F 3/0482* (2013.01)
*G06F 3/0481* (2013.01)
*G06F 3/048* (2013.01)
*G06F 17/00* (2006.01)

(52) U.S. Cl.
CPC ............ *G06F 3/0482* (2013.01); *G06F 3/0481* (2013.01)

(58) Field of Classification Search
USPC ......................................... 715/769
See application file for complete search history.

(56) References Cited

U.S. PATENT DOCUMENTS

| | | |
|---|---|---|
| 4,752,893 A | 6/1988 | Guttag et al. |
| 5,168,441 A | 12/1992 | Onarheim et al. |
| 5,260,778 A | 11/1993 | Kauffman et al. |
| 5,289,574 A | 2/1994 | Sawyer |
| 5,297,250 A | 3/1994 | Leroy et al. |
| 5,351,995 A | 10/1994 | Booker |
| 5,357,603 A | 10/1994 | Parker |
| 5,388,201 A | 2/1995 | Hourvitz et al. |
| 5,416,890 A | 5/1995 | Beretta |
| 5,446,891 A | 8/1995 | Kaplan et al. |
| 5,481,665 A | 1/1996 | Okada et al. |
| 5,490,246 A | 2/1996 | Brotsky et al. |

(Continued)

FOREIGN PATENT DOCUMENTS

| | | |
|---|---|---|
| CN | 1191344 | 8/1998 |
| CN | 1335951 | 2/2002 |

(Continued)

OTHER PUBLICATIONS

Portlet-to-portlet communication between JSR 168 portlets on public pages, Apr. 5, 2006, http://www.ibm.com/developerworks/websphere/library/techarticles/0604_scott/0604_scott.html.*

(Continued)

*Primary Examiner* — Yongjia Pan

(74) *Attorney, Agent, or Firm* — Fish & Richardson P.C.

(57) ABSTRACT

Systems, methods, computer-readable mediums, user interfaces and other implementations are disclosed for manually or automatically linking widgets. The automatic linking of widgets includes detecting a trigger event associated with a first widget, and providing access to a second widget in response to the trigger event. The trigger event can be the downloading, previewing, installation, launching, updating, operating or any other interaction with one or more widgets. The trigger event can also be the exercise of a function or feature of a widget. In some implementations, a communication path or channel is established between widgets for sharing information. In other implementations, linked widgets are provided access to shared information. A widget link manager can be used to manually establish links between widgets and to designate shared information, restrictions, etc.

27 Claims, 14 Drawing Sheets

(56) References Cited

U.S. PATENT DOCUMENTS

| | | | |
|---|---|---|---|
| 5,504,675 A | 4/1996 | Cragun et al. | |
| 5,522,022 A | 5/1996 | Rao et al. | |
| 5,537,630 A | 7/1996 | Berry et al. | |
| 5,564,002 A | 10/1996 | Brown | |
| 5,564,022 A | 10/1996 | Debnath et al. | |
| 5,588,098 A | 12/1996 | Chen et al. | |
| 5,602,997 A | 2/1997 | Carpenter et al. | |
| 5,638,501 A | 6/1997 | Gough et al. | |
| 5,644,737 A | 7/1997 | Tuniman et al. | |
| 5,644,739 A | 7/1997 | Moursund | |
| 5,651,107 A | 7/1997 | Frank et al. | |
| 5,657,049 A | 8/1997 | Ludolph et al. | |
| 5,659,693 A | 8/1997 | Hansen et al. | |
| 5,659,694 A | 8/1997 | Bibayan | |
| 5,666,416 A | 9/1997 | Micali | |
| 5,666,530 A | 9/1997 | Clark et al. | |
| 5,671,343 A | 9/1997 | Kondo et al. | |
| 5,689,664 A * | 11/1997 | Narayanan et al. | 715/769 |
| 5,708,764 A | 1/1998 | Borrel et al. | |
| 5,710,884 A | 1/1998 | Dedrick | |
| 5,710,922 A | 1/1998 | Alley et al. | |
| 5,721,848 A | 2/1998 | Joseph | |
| 5,727,129 A | 3/1998 | Barrett et al. | |
| 5,727,135 A | 3/1998 | Webb et al. | |
| 5,731,819 A | 3/1998 | Gagne et al. | |
| 5,742,285 A | 4/1998 | Ueda | |
| 5,742,768 A | 4/1998 | Gennaro et al. | |
| 5,754,174 A | 5/1998 | Carpenter et al. | |
| 5,760,773 A | 6/1998 | Berman et al. | |
| 5,764,229 A | 6/1998 | Bennett | |
| 5,764,238 A | 6/1998 | Lum et al. | |
| 5,790,120 A | 8/1998 | Lozares et al. | |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,809,230 A | 9/1998 | Pereira | |
| 5,835,692 A | 11/1998 | Cragun et al. | |
| 5,835,693 A | 11/1998 | Lynch et al. | |
| 5,838,316 A | 11/1998 | Arruza | |
| 5,838,906 A | 11/1998 | Doyle et al. | |
| 5,845,293 A | 12/1998 | Veghte et al. | |
| 5,870,734 A | 2/1999 | Kao | |
| 5,877,741 A | 3/1999 | Chee et al. | |
| 5,877,762 A | 3/1999 | Young et al. | |
| 5,878,219 A | 3/1999 | Vance et al. | |
| 5,883,639 A | 3/1999 | Walton et al. | |
| 5,900,876 A | 5/1999 | Yagita et al. | |
| 5,903,896 A | 5/1999 | Waldman et al. | |
| 5,917,436 A | 6/1999 | Endo et al. | |
| 5,920,659 A | 7/1999 | Iverson et al. | |
| 5,929,852 A | 7/1999 | Fisher et al. | |
| 5,933,148 A | 8/1999 | Oka et al. | |
| 5,949,409 A | 9/1999 | Tanaka et al. | |
| 5,963,191 A | 10/1999 | Jaaskelainen, Jr. | |
| 5,974,238 A | 10/1999 | Chase, Jr. | |
| 5,978,579 A | 11/1999 | Buxton et al. | |
| 5,991,735 A | 11/1999 | Gerace | |
| 5,999,948 A | 12/1999 | Nelson et al. | |
| 6,000,000 A | 12/1999 | Hawkins et al. | |
| 6,005,568 A | 12/1999 | Simonoff et al. | |
| 6,006,231 A | 12/1999 | Popa | |
| 6,006,274 A | 12/1999 | Hawkins et al. | |
| 6,011,562 A | 1/2000 | Gagne et al. | |
| 6,023,708 A | 2/2000 | Mendez et al. | |
| 6,031,937 A | 2/2000 | Graffagnino | |
| 6,034,621 A | 3/2000 | Kaufman | |
| 6,045,446 A | 4/2000 | Ohshima | |
| 6,061,695 A | 5/2000 | Slivka et al. | |
| 6,075,543 A | 6/2000 | Akeley | |
| 6,128,010 A | 10/2000 | Baxter et al. | |
| 6,133,915 A | 10/2000 | Arcuri et al. | |
| 6,144,381 A | 11/2000 | Lection et al. | |
| 6,154,601 A | 11/2000 | Yaegashi et al. | |
| 6,160,552 A | 12/2000 | Wilsher et al. | |
| 6,166,748 A | 12/2000 | Van Hook et al. | |
| 6,167,533 A | 12/2000 | Potterveld et al. | |
| 6,178,443 B1 | 1/2001 | Lin | |
| 6,188,399 B1 | 2/2001 | Voas et al. | |
| 6,191,797 B1 | 2/2001 | Politis | |
| 6,195,664 B1 | 2/2001 | Tolfa | |
| 6,211,890 B1 | 4/2001 | Ohba | |
| 6,232,957 B1 * | 5/2001 | Hinckley | 345/156 |
| 6,243,705 B1 | 6/2001 | Kucala | |
| 6,246,418 B1 | 6/2001 | Oka | |
| 6,253,122 B1 | 6/2001 | Razavi et al. | |
| 6,259,432 B1 | 7/2001 | Yamada et al. | |
| 6,266,053 B1 | 7/2001 | French et al. | |
| 6,266,430 B1 | 7/2001 | Rhoads | |
| 6,269,405 B1 | 7/2001 | Dutcher et al. | |
| 6,272,484 B1 | 8/2001 | Martin et al. | |
| 6,272,558 B1 | 8/2001 | Hui et al. | |
| 6,275,831 B1 | 8/2001 | Bodnar et al. | |
| 6,278,448 B1 | 8/2001 | Brown et al. | |
| 6,278,450 B1 | 8/2001 | Arcuri et al. | |
| 6,295,541 B1 | 9/2001 | Bodnar et al. | |
| 6,300,947 B1 | 10/2001 | Kanevsky | |
| 6,304,684 B1 | 10/2001 | Niczyporuk et al. | |
| 6,307,574 B1 | 10/2001 | Ashe et al. | |
| 6,310,621 B1 | 10/2001 | Gagne et al. | |
| 6,311,232 B1 | 10/2001 | Cagle et al. | |
| 6,313,851 B1 | 11/2001 | Matthews, III et al. | |
| 6,321,314 B1 | 11/2001 | Van Dyke | |
| 6,330,618 B1 | 12/2001 | Hawkins et al. | |
| 6,333,753 B1 * | 12/2001 | Hinckley | 715/768 |
| 6,344,855 B1 | 2/2002 | Fisher et al. | |
| 6,353,437 B1 | 3/2002 | Gagne | |
| 6,369,823 B2 | 4/2002 | Ohba | |
| 6,369,830 B1 | 4/2002 | Brunner et al. | |
| 6,396,520 B1 | 5/2002 | Ording | |
| 6,401,104 B1 | 6/2002 | LaRue et al. | |
| 6,411,274 B2 | 6/2002 | Watanabe et al. | |
| 6,411,301 B1 | 6/2002 | Parikh et al. | |
| 6,412,021 B1 | 6/2002 | Nguyen et al. | |
| 6,421,058 B2 | 7/2002 | Parikh et al. | |
| 6,424,348 B2 | 7/2002 | Parikh | |
| 6,430,576 B1 | 8/2002 | Gates et al. | |
| 6,434,744 B1 | 8/2002 | Chamberlain et al. | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,466,237 B1 | 10/2002 | Miyao et al. | |
| 6,469,714 B2 | 10/2002 | Buxton et al. | |
| 6,483,524 B1 | 11/2002 | Petchenkine et al. | |
| 6,484,261 B1 | 11/2002 | Wiegel | |
| 6,487,560 B1 | 11/2002 | LaRue et al. | |
| 6,489,963 B2 | 12/2002 | Parikh et al. | |
| 6,493,733 B1 | 12/2002 | Pollack et al. | |
| 6,512,522 B1 | 1/2003 | Miller et al. | |
| 6,515,682 B1 | 2/2003 | Washington et al. | |
| 6,525,736 B1 | 2/2003 | Erikawa et al. | |
| 6,526,174 B1 | 2/2003 | Graffagnino | |
| 6,535,892 B1 | 3/2003 | LaRue et al. | |
| 6,536,041 B1 | 3/2003 | Knudson et al. | |
| 6,542,160 B1 | 4/2003 | Abgrall | |
| 6,542,166 B1 | 4/2003 | Washington et al. | |
| 6,544,295 B1 | 4/2003 | Bodnar | |
| 6,571,245 B2 | 5/2003 | Chun et al. | |
| 6,571,328 B2 | 5/2003 | Liao et al. | |
| 6,573,896 B1 | 6/2003 | Dumas et al. | |
| 6,577,317 B1 | 6/2003 | Duluk, Jr. et al. | |
| 6,580,430 B1 | 6/2003 | Hollis et al. | |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,633,315 B1 | 10/2003 | Sobeski et al. | |
| 6,636,214 B1 | 10/2003 | Leather et al. | |
| 6,639,595 B1 | 10/2003 | Drebin et al. | |
| 6,644,046 B2 | 11/2003 | Cho et al. | |
| 6,661,426 B1 | 12/2003 | Jetha et al. | |
| 6,664,958 B1 | 12/2003 | Leather et al. | |
| 6,664,962 B1 | 12/2003 | Komsthoeft et al. | |
| 6,664,986 B1 | 12/2003 | Kopelman et al. | |

(56) References Cited

U.S. PATENT DOCUMENTS

| | | | |
|---|---|---|---|
| 6,674,438 B1 | 1/2004 | Yamamoto et al. | |
| 6,687,745 B1 | 2/2004 | Franco et al. | |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,714,221 B1 | 3/2004 | Christie et al. | |
| 6,715,053 B1 | 3/2004 | Grigor | |
| 6,717,599 B1 | 4/2004 | Olano | |
| 6,724,403 B1 | 4/2004 | Santoro et al. | |
| 6,734,864 B2 | 5/2004 | Abgrall | |
| 6,738,804 B1 | 5/2004 | Lo | |
| 6,741,242 B1 | 5/2004 | Itoh et al. | |
| 6,742,042 B1 | 5/2004 | Orton et al. | |
| 6,757,691 B1 | 6/2004 | Welsh et al. | |
| 6,757,698 B2 | 6/2004 | McBride et al. | |
| 6,760,046 B2 | 7/2004 | I'Anson et al. | |
| 6,765,592 B1 | 7/2004 | Pletcher et al. | |
| 6,788,318 B2 | 9/2004 | Chen | |
| 6,792,616 B1 | 9/2004 | Jerding et al. | |
| 6,795,060 B2 | 9/2004 | Rekimoto et al. | |
| 6,806,892 B1 | 10/2004 | Plow et al. | |
| 6,882,979 B1 | 4/2005 | Reay et al. | |
| 6,892,360 B1* | 5/2005 | Pabla et al. | 715/802 |
| 6,906,720 B2 | 6/2005 | Emberling et al. | |
| 6,910,000 B1 | 6/2005 | Yedidia et al. | |
| 6,910,052 B2 | 6/2005 | Gates et al. | |
| 6,911,984 B2 | 6/2005 | Sabella et al. | |
| 6,918,091 B2 | 7/2005 | Leavitt et al. | |
| 6,925,477 B1 | 8/2005 | Champagne et al. | |
| 6,931,633 B1 | 8/2005 | Vazquez et al. | |
| 6,944,829 B2 | 9/2005 | Dando | |
| 6,993,721 B2 | 1/2006 | Rosin et al. | |
| 7,007,041 B2 | 2/2006 | Multer et al. | |
| 7,007,242 B2 | 2/2006 | Suomela et al. | |
| 7,016,011 B2 | 3/2006 | De Haan | |
| 7,024,381 B1 | 4/2006 | Hastings et al. | |
| 7,027,055 B2 | 4/2006 | Anderson et al. | |
| 7,028,264 B2 | 4/2006 | Santoro et al. | |
| 7,030,890 B1* | 4/2006 | Jouet et al. | 345/619 |
| 7,036,083 B1 | 4/2006 | Zenith | |
| 7,050,955 B1 | 5/2006 | Carmel et al. | |
| 7,076,730 B1 | 7/2006 | Baker | |
| 7,082,577 B1 | 7/2006 | Brosnahan | |
| 7,085,994 B2 | 8/2006 | Gvily | |
| 7,107,546 B2 | 9/2006 | Coulthard | |
| 7,127,473 B2 | 10/2006 | Agassi et al. | |
| 7,127,509 B2 | 10/2006 | Wu | |
| 7,127,713 B2 | 10/2006 | Davis et al. | |
| 7,146,563 B2* | 12/2006 | Hesmer et al. | 715/223 |
| 7,174,512 B2 | 2/2007 | Martin et al. | |
| 7,185,290 B2* | 2/2007 | Cadiz et al. | 715/838 |
| 7,191,399 B2 | 3/2007 | Ohtani et al. | |
| 7,216,351 B1 | 5/2007 | Maes | |
| 7,222,155 B1 | 5/2007 | Gebhardt et al. | |
| 7,242,406 B2 | 7/2007 | Robotham et al. | |
| 7,249,327 B2 | 7/2007 | Nelson et al. | |
| 7,260,380 B2 | 8/2007 | Dietl et al. | |
| 7,269,792 B2* | 9/2007 | Consolatti et al. | 715/749 |
| 7,281,202 B2 | 10/2007 | Croney et al. | |
| 7,293,034 B2 | 11/2007 | Paya et al. | |
| 7,315,848 B2 | 1/2008 | Pearse et al. | |
| 7,328,435 B2 | 2/2008 | Trifon | |
| 7,346,766 B2 | 3/2008 | Mackin et al. | |
| 7,353,465 B2 | 4/2008 | Callaway et al. | |
| 7,356,816 B2 | 4/2008 | Goodman et al. | |
| 7,392,483 B2* | 6/2008 | Wong et al. | 715/746 |
| 7,401,104 B2 | 7/2008 | Shah et al. | |
| 7,426,687 B1 | 9/2008 | Schultz et al. | |
| 7,437,485 B1 | 10/2008 | Kruglikov et al. | |
| 7,472,350 B2 | 12/2008 | Hintermeister et al. | |
| 7,478,326 B2 | 1/2009 | Holecek et al. | |
| 7,490,295 B2 | 2/2009 | Chaudhri et al. | |
| 7,502,838 B2 | 3/2009 | Franco et al. | |
| 7,503,010 B2 | 3/2009 | Chaudhri et al. | |
| 7,516,158 B2 | 4/2009 | Drukman et al. | |
| 7,523,401 B1 | 4/2009 | Aldridge | |
| 7,530,026 B2 | 5/2009 | Chaudhri et al. | |
| 7,546,543 B2 | 6/2009 | Louch et al. | |
| 7,546,554 B2* | 6/2009 | Chiu et al. | 715/864 |
| 7,552,397 B2 | 6/2009 | Holecek et al. | |
| 7,568,165 B2* | 7/2009 | Amadio et al. | 715/779 |
| 7,613,834 B1 | 11/2009 | Pallipuram et al. | |
| 7,614,011 B2 | 11/2009 | Karidis et al. | |
| 7,644,391 B2* | 1/2010 | Fisher et al. | 717/109 |
| 7,657,837 B2 | 2/2010 | Shappir et al. | |
| 7,676,483 B2 | 3/2010 | Klug | |
| 7,698,658 B2 | 4/2010 | Ohwa et al. | |
| 7,730,082 B2 | 6/2010 | Sah et al. | |
| 7,752,556 B2* | 7/2010 | Forstall et al. | 715/761 |
| 7,756,723 B2 | 7/2010 | Rosow et al. | |
| 7,761,800 B2 | 7/2010 | Chaudhri et al. | |
| 7,765,326 B2 | 7/2010 | Robbin et al. | |
| 7,765,493 B2 | 7/2010 | Chickles et al. | |
| 7,784,065 B2 | 8/2010 | Polivy et al. | |
| 7,793,222 B2 | 9/2010 | Chaudhri et al. | |
| 7,793,227 B2 | 9/2010 | Wada et al. | |
| 7,793,232 B2 | 9/2010 | Chaudhri et al. | |
| 7,797,446 B2 | 9/2010 | Heller et al. | |
| 7,802,246 B1 | 9/2010 | Kennedy et al. | |
| 7,814,148 B2 | 10/2010 | Bell et al. | |
| RE41,922 E* | 11/2010 | Gough et al. | 715/803 |
| 7,873,908 B1 | 1/2011 | Varanasi et al. | |
| 7,873,910 B2* | 1/2011 | Chaudhri et al. | 715/764 |
| 7,890,324 B2* | 2/2011 | Bangalore et al. | 704/231 |
| 7,925,976 B2 | 4/2011 | Shin et al. | |
| 7,945,855 B2 | 5/2011 | Altman et al. | |
| 7,996,783 B2 | 8/2011 | Ramsey et al. | |
| 8,001,476 B2* | 8/2011 | Gallo | 715/742 |
| 8,126,774 B2 | 2/2012 | Hendrickson et al. | |
| 8,245,027 B2 | 8/2012 | Bear et al. | |
| 8,260,353 B2 | 9/2012 | Hugot | |
| 8,302,020 B2* | 10/2012 | Louch et al. | 715/764 |
| 8,352,966 B2* | 1/2013 | Clayton et al. | 719/328 |
| 2001/0017632 A1 | 8/2001 | Goren-Bar | |
| 2001/0019338 A1 | 9/2001 | Roth | |
| 2001/0030647 A1 | 10/2001 | Sowizral et al. | |
| 2001/0035885 A1 | 11/2001 | Iron et al. | |
| 2002/0013822 A1 | 1/2002 | West | |
| 2002/0026474 A1 | 2/2002 | Wang et al. | |
| 2002/0049788 A1 | 4/2002 | Lipkin et al. | |
| 2002/0054148 A1* | 5/2002 | Okada | 345/810 |
| 2002/0054541 A1 | 5/2002 | Hall | |
| 2002/0059594 A1 | 5/2002 | Rasmussen et al. | |
| 2002/0065946 A1 | 5/2002 | Narayan | |
| 2002/0066279 A1 | 6/2002 | Kiyomatsu | |
| 2002/0067376 A1 | 6/2002 | Martin et al. | |
| 2002/0067418 A1 | 6/2002 | I | |
| 2002/0078255 A1 | 6/2002 | Narayan | |
| 2002/0078453 A1 | 6/2002 | Kuo | |
| 2002/0085037 A1 | 7/2002 | Leavitt et al. | |
| 2002/0087632 A1 | 7/2002 | Keskar | |
| 2002/0089526 A1 | 7/2002 | Buxton et al. | |
| 2002/0093516 A1 | 7/2002 | Brunner et al. | |
| 2002/0099678 A1 | 7/2002 | Albright et al. | |
| 2002/0105548 A1 | 8/2002 | Hayton et al. | |
| 2002/0111934 A1 | 8/2002 | Narayan | |
| 2002/0112180 A1 | 8/2002 | Land et al. | |
| 2002/0114466 A1 | 8/2002 | Tanaka et al. | |
| 2002/0118217 A1 | 8/2002 | Fujiki | |
| 2002/0120673 A1 | 8/2002 | Tolson et al. | |
| 2002/0123739 A1 | 9/2002 | Haacke et al. | |
| 2002/0129092 A1 | 9/2002 | Tolson et al. | |
| 2002/0133508 A1 | 9/2002 | LaRue et al. | |
| 2002/0140740 A1 | 10/2002 | Chen | |
| 2002/0147782 A1 | 10/2002 | Dimitrova et al. | |
| 2002/0152098 A1 | 10/2002 | Evans et al. | |
| 2002/0156798 A1 | 10/2002 | LaRue et al. | |
| 2002/0158902 A1 | 10/2002 | Hooker et al. | |
| 2002/0171682 A1 | 11/2002 | Frank et al. | |
| 2002/0174003 A1 | 11/2002 | Redmann et al. | |
| 2002/0174055 A1* | 11/2002 | Dick et al. | 705/37 |
| 2002/0174181 A1 | 11/2002 | Wei | |
| 2002/0180798 A1 | 12/2002 | Poor et al. | |
| 2002/0186257 A1 | 12/2002 | Cadiz et al. | |

(56) References Cited

U.S. PATENT DOCUMENTS

| | | |
|---|---|---|
| 2002/0194090 A1 | 12/2002 | Gagnon et al. |
| 2002/0196268 A1 | 12/2002 | Wolff et al. |
| 2003/0000661 A1 | 1/2003 | Joyce et al. |
| 2003/0008711 A1 | 1/2003 | Corbo |
| 2003/0009267 A1 | 1/2003 | Dunsky et al. |
| 2003/0018971 A1 | 1/2003 | McKenna, Jr. |
| 2003/0020671 A1 | 1/2003 | Santoro et al. |
| 2003/0032409 A1 | 2/2003 | Hutcheson et al. |
| 2003/0046316 A1 | 3/2003 | Gergic et al. |
| 2003/0061482 A1 | 3/2003 | Emmerichs |
| 2003/0067489 A1 | 4/2003 | Wong et al. |
| 2003/0069904 A1 | 4/2003 | Hsu et al. |
| 2003/0076369 A1 | 4/2003 | Resner et al. |
| 2003/0079038 A1 | 4/2003 | Robbin et al. |
| 2003/0080995 A1 | 5/2003 | Tenenbaum et al. |
| 2003/0097659 A1 | 5/2003 | Goldman |
| 2003/0101046 A1 | 5/2003 | Krasnov |
| 2003/0122787 A1 | 7/2003 | Zimmerman et al. |
| 2003/0123739 A1 | 7/2003 | Graffagnino |
| 2003/0125057 A1 | 7/2003 | Pesola |
| 2003/0125962 A1 | 7/2003 | Holliday et al. |
| 2003/0130984 A1 | 7/2003 | Quinlan et al. |
| 2003/0146934 A1 | 8/2003 | Bailey et al. |
| 2003/0154239 A1 | 8/2003 | Davis et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0206195 A1 | 11/2003 | Matsa et al. |
| 2003/0208685 A1 | 11/2003 | Abdel-Rahman |
| 2004/0003402 A1 | 1/2004 | McKenna, Jr. |
| 2004/0012626 A1 | 1/2004 | Brookins |
| 2004/0015942 A1 | 1/2004 | Branson et al. |
| 2004/0024616 A1 | 2/2004 | Spector et al. |
| 2004/0032409 A1 | 2/2004 | Girard |
| 2004/0036711 A1 | 2/2004 | Anderson |
| 2004/0039934 A1 | 2/2004 | Land et al. |
| 2004/0054711 A1 | 3/2004 | Multer |
| 2004/0070629 A1 | 4/2004 | Seifert |
| 2004/0078814 A1 | 4/2004 | Allen |
| 2004/0090969 A1* | 5/2004 | Jerrard-Dunne et al. 370/395.54 |
| 2004/0117831 A1 | 6/2004 | Ellis et al. |
| 2004/0119754 A1 | 6/2004 | Bangalore et al. |
| 2004/0125128 A1 | 7/2004 | Chang et al. |
| 2004/0142711 A1 | 7/2004 | Mahonen et al. |
| 2004/0179019 A1 | 9/2004 | Sabella et al. |
| 2004/0181580 A1 | 9/2004 | Baranshamaje |
| 2004/0183800 A1 | 9/2004 | Peterson |
| 2004/0194020 A1 | 9/2004 | Beda et al. |
| 2004/0199574 A1 | 10/2004 | Franco et al. |
| 2004/0203684 A1 | 10/2004 | Jokinen et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0216054 A1 | 10/2004 | Mathews et al. |
| 2004/0223003 A1 | 11/2004 | Heirich et al. |
| 2004/0225955 A1 | 11/2004 | Ly |
| 2004/0230911 A1 | 11/2004 | Bent et al. |
| 2004/0237082 A1 | 11/2004 | Alcazar et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0057497 A1 | 3/2005 | Kawahara |
| 2005/0060655 A1 | 3/2005 | Gray et al. |
| 2005/0060661 A1 | 3/2005 | Kawahara et al. |
| 2005/0076305 A1 | 4/2005 | Hintermeister et al. |
| 2005/0085272 A1 | 4/2005 | Anderson et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0091690 A1 | 4/2005 | Delpuch et al. |
| 2005/0093868 A1 | 5/2005 | Hinckley |
| 2005/0114021 A1 | 5/2005 | Krull et al. |
| 2005/0125787 A1* | 6/2005 | Tertitski et al. ............... 717/162 |
| 2005/0144563 A1 | 6/2005 | Hough et al. |
| 2005/0144595 A1 | 6/2005 | McLean |
| 2005/0149458 A1 | 7/2005 | Eglen et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1* | 9/2005 | Matthews et al. ............. 715/779 |
| 2005/0215310 A1 | 9/2005 | Boyd et al. |
| 2005/0221808 A1 | 10/2005 | Karlsson et al. |
| 2005/0229118 A1* | 10/2005 | Chiu et al. .................... 715/864 |
| 2005/0234884 A1 | 10/2005 | Drukman et al. |
| 2005/0240857 A1 | 10/2005 | Benedict et al. |
| 2005/0243373 A1 | 11/2005 | Silverbrook et al. |
| 2005/0256940 A1 | 11/2005 | Henderson et al. |
| 2005/0278651 A1 | 12/2005 | Coe et al. |
| 2005/0282612 A1 | 12/2005 | Mathews |
| 2005/0283734 A1 | 12/2005 | Santoro et al. |
| 2006/0001652 A1 | 1/2006 | Chiu et al. |
| 2006/0004913 A1* | 1/2006 | Chong ........................ 709/217 |
| 2006/0005207 A1 | 1/2006 | Louch et al. |
| 2006/0010394 A1 | 1/2006 | Chaudhri et al. |
| 2006/0015818 A1 | 1/2006 | Chaudhri et al. |
| 2006/0015846 A1 | 1/2006 | Fraleigh et al. |
| 2006/0031264 A1 | 2/2006 | Bosworth et al. |
| 2006/0031587 A1 | 2/2006 | Paterson et al. |
| 2006/0036703 A1 | 2/2006 | Fulmer et al. |
| 2006/0036941 A1 | 2/2006 | Neil |
| 2006/0036969 A1* | 2/2006 | Guido et al. .................. 715/804 |
| 2006/0041879 A1 | 2/2006 | Bower et al. |
| 2006/0053384 A1* | 3/2006 | La Fetra et al. ............... 715/765 |
| 2006/0059437 A1* | 3/2006 | Conklin ......................... 715/800 |
| 2006/0064422 A1* | 3/2006 | Arthurs et al. .................... 707/10 |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107229 A1 | 5/2006 | Matthews et al. |
| 2006/0107231 A1 | 5/2006 | Matthews et al. |
| 2006/0112123 A1 | 5/2006 | Clark et al. |
| 2006/0123356 A1 | 6/2006 | Sobeski et al. |
| 2006/0123359 A1 | 6/2006 | Schatzberger |
| 2006/0136843 A1 | 6/2006 | Shafron |
| 2006/0150118 A1 | 7/2006 | Chaudhri et al. |
| 2006/0154649 A1 | 7/2006 | Pedersen et al. |
| 2006/0156228 A1* | 7/2006 | Gallo et al. .................... 715/523 |
| 2006/0156248 A1 | 7/2006 | Chaudhri et al. |
| 2006/0167704 A1 | 7/2006 | Nicholls et al. |
| 2006/0168536 A1* | 7/2006 | Portmann ...................... 715/762 |
| 2006/0168538 A1 | 7/2006 | Stevens et al. |
| 2006/0174202 A1* | 8/2006 | Bonner ......................... 715/750 |
| 2006/0197752 A1 | 9/2006 | Hurst et al. |
| 2006/0200775 A1 | 9/2006 | Behr et al. |
| 2006/0205517 A1* | 9/2006 | Malabuyo et al. ............... 463/43 |
| 2006/0206835 A1 | 9/2006 | Chaudhri et al. |
| 2006/0218499 A1 | 9/2006 | Matthews et al. |
| 2006/0230059 A1* | 10/2006 | Etgen et al. ............... 707/103 R |
| 2006/0230272 A1 | 10/2006 | Lawrence et al. |
| 2006/0236257 A1 | 10/2006 | Othmer et al. |
| 2006/0248471 A1 | 11/2006 | Lindsay et al. |
| 2006/0253794 A1 | 11/2006 | Wilson |
| 2006/0271637 A1 | 11/2006 | McKeon et al. |
| 2006/0274086 A1 | 12/2006 | Forstall et al. |
| 2006/0277469 A1 | 12/2006 | Chaudhri et al. |
| 2006/0277481 A1* | 12/2006 | Forstall et al. ................ 715/764 |
| 2006/0282574 A1 | 12/2006 | Zotov et al. |

(56) References Cited

U.S. PATENT DOCUMENTS

| | | | |
|---|---|---|---|
| 2007/0011026 A1 | 1/2007 | Higgins et al. | |
| 2007/0038934 A1 | 2/2007 | Fellman | |
| 2007/0044029 A1 | 2/2007 | Fisher et al. | |
| 2007/0044039 A1 | 2/2007 | Amadio et al. | |
| 2007/0061724 A1 | 3/2007 | Slothouber et al. | |
| 2007/0074126 A1 | 3/2007 | Fisher et al. | |
| 2007/0078953 A1* | 4/2007 | Chai et al. | 709/219 |
| 2007/0101146 A1 | 5/2007 | Louch et al. | |
| 2007/0101279 A1 | 5/2007 | Chaudhri et al. | |
| 2007/0101288 A1 | 5/2007 | Forstall et al. | |
| 2007/0101297 A1 | 5/2007 | Forstall et al. | |
| 2007/0101433 A1 | 5/2007 | Louch et al. | |
| 2007/0112739 A1 | 5/2007 | Burns et al. | |
| 2007/0118813 A1 | 5/2007 | Forstall et al. | |
| 2007/0129888 A1 | 6/2007 | Rosenberg | |
| 2007/0130523 A1 | 6/2007 | Ku et al. | |
| 2007/0130541 A1 | 6/2007 | Louch et al. | |
| 2007/0157119 A1 | 7/2007 | Bishop | |
| 2007/0162850 A1 | 7/2007 | Adler et al. | |
| 2007/0198946 A1 | 8/2007 | Viji et al. | |
| 2007/0203984 A2 | 8/2007 | AlHusseini et al. | |
| 2007/0209013 A1 | 9/2007 | Ramsey et al. | |
| 2007/0233736 A1 | 10/2007 | Xiong et al. | |
| 2007/0266093 A1 | 11/2007 | Forstall et al. | |
| 2007/0273558 A1 | 11/2007 | Smith et al. | |
| 2008/0016468 A1 | 1/2008 | Chambers et al. | |
| 2008/0034309 A1 | 2/2008 | Louch et al. | |
| 2008/0034314 A1 | 2/2008 | Louch et al. | |
| 2008/0126937 A1* | 5/2008 | Pachet | 715/720 |
| 2008/0155453 A1 | 6/2008 | Othmer | |
| 2008/0168367 A1 | 7/2008 | Chaudhri et al. | |
| 2008/0168368 A1 | 7/2008 | Louch et al. | |
| 2008/0168382 A1 | 7/2008 | Louch et al. | |
| 2008/0288578 A1 | 11/2008 | Silverberg | |
| 2009/0005071 A1 | 1/2009 | Forstall et al. | |
| 2009/0021486 A1 | 1/2009 | Chaudhri et al. | |
| 2009/0024944 A1 | 1/2009 | Louch et al. | |
| 2009/0044138 A1 | 2/2009 | Rudolph et al. | |
| 2009/0077493 A1 | 3/2009 | Hempel et al. | |
| 2009/0125815 A1 | 5/2009 | Chaudhri et al. | |
| 2009/0144644 A1 | 6/2009 | Chaudhri et al. | |
| 2009/0158193 A1 | 6/2009 | Chaudhri et al. | |
| 2009/0187841 A1 | 7/2009 | Chaudhri et al. | |
| 2009/0228824 A1 | 9/2009 | Forstall et al. | |
| 2009/0260022 A1 | 10/2009 | Louch et al. | |
| 2009/0271724 A1 | 10/2009 | Chaudhri et al. | |

FOREIGN PATENT DOCUMENTS

| | | |
|---|---|---|
| CN | 1425151 | 6/2003 |
| DE | 102 42 378 | 3/2004 |
| EP | 548586 | 6/1993 |
| EP | 0694879 | 1/1996 |
| EP | 0 908 835 | 4/1999 |
| EP | 1 237 076 | 9/2002 |
| EP | 1383080 | 1/2004 |
| EP | 0972273 | 3/2004 |
| EP | 1 724 996 | 11/2006 |
| JP | 8-211167 | 8/1996 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 02/25382 | 3/2002 |
| WO | WO 03/023593 | 3/2003 |
| WO | WO 2004/023294 | 3/2004 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/119269 | 11/2006 |
| WO | WO 2009/012319 | 12/2009 |
| WO | WO 2009/012330 | 12/2009 |

OTHER PUBLICATIONS

Portlet Communication: What is application scope, anyway?, Sep. 18, 2002, http://www.coderanch.com/t/203244/Portals-Portlets/java/Portlet-Communication-What-application-scope.*
Konfabulator 2, Aug. 12, 2005, http://web.archive.org/web/20050812004708/http://www.konfabulator.com/.*
Inter-widget communication?, Nov. 15, 2002, http://www2.konfabulator.com/forums/lofiversion/index.php/t125.html.*
Widget Test Ground, Dec. 1, 2005, 5 pages.*
tellWidget, Sep. 5, 2005, 3 pages.*
Widget Creation Tutorial, Oct. 30, 2005, 25 pages.*
Defination of Install, retrieved Jan. 30, 2010, 2 pages.*
Juan R. Rodriguez; Serena Chan; Belen Gonzalez; George Kroner; Monica Parlangelo; Sandro Schwedler; Andre Venancio, IBM WebSphere Portal V5 a Guide for Portlet Application Development, Feb. 1, 2004, 48 pages.*
Inter-Widget Communication, Dec. 4, 2007, 7 pages.*
Inter-Widget Messaging!, I want my widgets to work together!, Feb. 7, 2005, 4 pages.*
widget to widget communication, Jun. 29, 2006, 2 pages.*
Widgets 1.0, Nov. 9, 2006, 13 pages.*
Dashboard Widgets, Jun. 8, 2005, 2 pages.*
Discovering the Dashboard, Apr. 28, 2005, 10 pages.*
How-To Keeping multiple dashboard widgets on the desktop, Apr. 30, 2005, 8 pages.*
Konfabulator 1.7—Now with Konspose and Unicode support!, Jun. 25, 2004, 11 pages.*
Konsposé and Activation, Jun. 30, 2004, 2 pages.*
Konsposé speed, Sep. 24, 2004, 3 pages.*
Macworld unveils Dashboard Widget, Aug. 30, 2005, 5 pages.*
Adam Baratz, Konfabulator 2.0 Before there was Dashboard, there was Konfabulator. While Apple was working on . . . , Jun. 22, 2005, 9 pages.*
A Better Konsposé Background, Aug. 10, 2004, 1 page.*
Konfabulator Release Notes, Jul. 9, 2004. 3 pages.*
Yes . . . another Newbie in need of Help!! How do I set Hotkeys?, Jul. 25, 2004, 2 pages.*
Dashboard vs Konfabulator, Apr. 25, 2005, 31 pages.*
Konspose Only—what's the deal?, Oct. 18, 2005, 2 pages.*
Widgets only when needed, Jul. 8, 2004, 3 pages.*
Hide all Widgets on Desktop, Oct. 12, 2004, 5 pages.*
Joe Kniss, Gordon Kindlmann, Charles Hansen, Interactive Volume Rendering Using Multi-Dimensional Transfer Functions and Direct Manipulation Widgets, Oct. 24-26, 2001, 1 page.*
Balazs Fejes, Programming Konfabulator Widgets, Feb. 25, 2006, 5 pages.*
Scott Collins, Konfabulator: The Beginning Widget Writers Guide, Jan. 15, 2006, 28 pages.*
Yahoo Widget Engine Reference Manual, Dec. 7, 2005, 229 pages.*
John Joyce, The fabulous Konfabulator: what can it really do?, Dec. 1, 2005, 3 pages.*
DesktopX 3: Creating a widget, Mar. 6, 2005, 7 pages.*
Conner Borookshire D. et al. "Three-Dimensional Widgets" ACM 1992, 8 pages.
Http://en.wikipedia.org/wiki/Comparison_of_widget_engines, 2007, 6 pages.
http://en.wikipedia.org/wiki/Windows-Sidebar, 2007, 7 pages.
http://www.nat.org/dashboard/blog.php3 Dec. 2003, 31 pages.
International Search Report , PCT/US2005/008804, Jul. 27, 2005, 3 pages.
Snippet Software Inc. et al. "Corporate Portal Newsletter" Oct. 2000, 3 pages.
Snippet Software Inc. et al. "Snippets Software" Jun. 2001, 16 pages.
Stardock.com et al. "DesktopX Whitepaper and users Guide" 1999, 72 pages.
Tang, J.C. et al., "ConNexus to Awarenex: Extending Awareness to Mobile Users," SIGCHI '01, AMC, Mar. 31-Apr. 4, 2001, 8 pages.
Ullenboom, C., "Java ist auch eine Insel," 2003, [online] [Retrieved on Apr. 13, 2006] Retrieved from the Internet URL: http://www.galileocomputing.de/openbook/javainsel2//java_140000.htm#Xxx998138, 3 pages.

(56) References Cited

OTHER PUBLICATIONS

Wardell, Brad, Konfabulator for Windows, Jan. 10, 2004; [online] Retrieved from the Internet Mar. 6, 2006] Retrieved from the Internet: URL: http://www.xpthemes.com/forums.asp?MID=19&CMID=19&AID=4472, 6 pages.

"Sidekick", [Online] [Retrieved on Oct. 12, 2009] Retrieved from the Internet at URL: http://en.widipedia.org/wiki/Sidekick; 5 pages.

"Desktop Sidebar", [online] [Retrieved on May 11, 2007] Retrieved from the Internet URL: http://web.archive.org/web/20040101160831/http://www.desktopsidebar.com/; 5 pages.

Garmin® nüvifone™ Images, [online] [Retrieved from the Internet on Feb. 4, 2008], URL: http://www8.garmin.com/buzz/nuvifone/media_gallery.jsp; 2 pages.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

Ackley, "CG—Teaching Cg," Power Point Presentation, NVIDIA Corporation, 2002.

International Search Report and the Written Opinion of the International Searching Authority, dated Jan. 27, 2006, issued in International Application PCT/US2005/022579.

International Search Report and Written Opinion, dated Sep. 3, 2009, issued in International Application No. PCT/US2008/050047; 17 pages.

Snippet Software, "Product Spotlight Non-browser based portal solution from Snippets Software", Corporate Portal Newsletter, Oct. 2000, vol. 1, No. 10, 3 pages.

Stardock, "Gallactica Civilization: Dread Lords—User Manual", Stardock Entertainment © 2006; 65 pages.

Stardock, "Your Edge in Software", [online] [Retrieved on May 11, 2007]; Retrieved from the Internet URL: http://www.stardock.com/media.asp?cmd=mediakits; 56 pages.

Van Gelder et al, "Direct Volume Rendering with Shading via Three-Dimensional Textures," Computer Science Dept., Univ. of California, Santa Cruz, CA 95064, Jul. 19, 1996.

"About Merkitys"; [online] [Retrieved on Feb. 4, 2008]; Retrieved from the Internet, URL: http://meaning.3xi.org/; 3 pages.

"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.

"Comarison of widget engines", http://en.wikipedia.org/wiki/Comparison_of_widget_engines, 2007, 6 pages.

"Coolsmartphone"; [online] [Retrieved on Apr. 13, 2006]; Retrieved from the Internet, URL: http://www.coolsmartphone.com/article569.html; 57 pages.

"Dashboard Blog", Dec. 2003, Retrieved from the Internet on May 11, 2007 <URL:http://www.nat.org/dashboard/blog.php3> 31pages.

"Garmin hits iphone directly with nuvifone"; [online] [Retrieved on Mar. 17, 2008]; Retrieved from the Internet, URL: http://www.electronista.com/print/50764; 3 pages.

"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006] Retrieve from the Internet, URL: http://www.dailywireless.org/modules.php?name=News&file=article&sid=4613; 3 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"MOREnet Dialing Plan: PSTN and IP Network Integration for H.323, H320 VoIP and Public Voice Networks", [online] [Retrieved on Jan. 11, 2008] Retrieved from the Interent < URL: http://www.more.net/technical/research/dialplan/index.html, 12 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"SNAP, MAP and SHARE Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

"Windows Sidebar", Wikipedia, Retrieved from the Internet, <URL:http://en.wikipedia.org/wiki/Windows-Sidebar>, 2007, 7 pages.

"Convert just about Anything to Anything else", OnlineConversion.com, Aug. 2000, [online] [Retrieved on Jun. 22, 2008] Retrieved from the Internet, URL:http://web.archive.org/web/200000815055422/http://www.onlineconversion.com/>.

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.

Beier et al., "The bull's-eye: a framework for web application user interface design guidelines", Proceedings of the Sigchi Conference on Human Factors in Computing Systems, Apr. 2003, pp. 489-496.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, Oct. 12-15, 2003, pp. 975-978.

Chinese Notification of First Office Action, Chinese Patent Application No. 200580016349.3, Jul. 25, 2008, 21 pages.

Conner et al. "Three-Dimensional Widgets" ACM 1992, pp. 183-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.

Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Han; "Bi-manual, multi-point, and multi-user interactions on a graphical interaction surface"; Mutli-Touch Interaction Research; [online] [Retrieved on Apr. 13, 2006]; Retrieved from the Internet, URL: http://mrl.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

International Search Report, PCT/US2005/008804, Jul. 27, 2005, 3 pages.

International Search Report and Writen Opinion, PCT/US2005/022152, Jul. 10, 2006, 8 pages.

International Search report, PCT/US2005/008805, Aug. 8, 2005, 3 pages.

(56) References Cited

OTHER PUBLICATIONS

Invitation to Pay Additional Fees(Form PCT/ISA/206) and Communication Relating to the Results of the Partial Intrenational Search (PCT/ISA/206 (Annex)) for PCT/US2007/077441; dated Jan. 28, 2008, 8 pages.
Invitation to Pay Additional Fees(Form PCT/ISA/206) and Communication Relating to the Results of the Partial Intrenational Search (PCT/ISA/206 (Annex)) for PCT/US2008/050295; dated Jul. 29, 2008.
Konfabulator, "Cupertino, Start your Photocopiers!," [online] [Retrieved on Jul. 1, 2004] Retrieved from the Internet <URL: http://www.konfabulator.com>, 1 page.
Konfabulator, "Konfabulator & Widget Basics," [online] [Retrieved on Jul. 1, 2004] Retrieved from the Internet <URL: http://www.konfabulator.com/info/basics.html>, 3 pages.
Konfabulator, "Screenshots," [online] [Retrieved on Jul. 1, 2004] Retrieved from the Internet <URL: http://www.konfabulator.com/info/screenshots.html>, 2 pages.
Konfabulator, "What is Konfabulator?," [online] [Retrieved on Jul. 1, 2004] Retrieved from the Internet <URL: http://www.konfabulator.com/info/>, 3 pages.
Lammers, J.., et al., "Maya 4.5 Fundamentals: Particles,"New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.
Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.
Microsoft Corporation, "User's Guide Microsoft® Windows™ and MS-DOS® 6", 1993, pp. Cover-xvi, 112-121.
Notification of Transmittal of the International Search Report and the Written Opinion of the International Searching Authority, PCT/US2007/077441, May 8, 2008; 17 pages.
Puder, A., "Extending Desktop Applications to the Web," ACM International Conference Proceedings Series, Proceedings of the Jun. 2004 International Symposium on Information and Communication Technologies, 2004, vol. 90, 6 pages.
Rist et al., "Customizing Graphics for Tiny Displays of Mobile Devices", Personal and Ubiquitous Computing, 2002, pp. 260-268, vol. 6.
Rochkind, M. et al., "Common Elements in Today's Graphical User Interfaces: The Good, the Bad, and the Ugly," Interchi '93, AMC, Apr. 24-29, 1993, pp. 470-473.
Segal, Mark and Akeley, Kurt, "The OpenGL Graphics System: A Specification (Version 1.5)," Copyright 1992-2003 Silicon Graphics, Inc., Oct. 30, 2003, 334 pages.
Shantzis, Michael A., "A Model for Efficient and Flexible Image Computing," Computer Graphics Proceedings, Annual Conference Series, Orlando, Florida, Jul. 24-29, 1994, pp. 147-154.
Shiozawa, Hidekazu et al., "Perspective Layered Visualization of Collaborative Workspaces," Proceedings of the International ACM SIGGROUP conference on Supporting Group Work Publisher, Nov. 1999, 5 pages.
Snippet Software, "Snippets Software Platform", Retrieved from the Internet on Jun. 11, 2001 <URL:http://www.snippets.com/products/>.
Snippets Software et al., "Products Overview", Feb. 2002, [online] [Retrieved on Feb. 5, 2008] Retrieved from the Internet URL: http://web.archive.org/web/20020206061508/http://www.snippets.com/products/>.
Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3 Dec. 2003, 8 pages.
Stardock et al., "DesktopX General Guide," Aug. 2000, [online] [Retrieved on Jan. 31, 2008] Retrieved from the Internet URL:http://www.stardock.com/products/desktopx/docs/.
Stardock et al., "DesktopX Tutorial", Aug. 2000, [online] [Retrieved on Jan. 31, 2008] Retrieved from the Internet URL:http://www.stardock.com/products/desktopx/tutorial.html.
Stardock et al., "DesktopX WhitePaper", Aug. 2000, [online] [Retrieved on Jan. 31, 2008] Retrieved from the Internet <URL:http://www.stardock.net/media/whitepaper_desktopx.html.
Stardock et al., "The User Guide—Version 2", DesktopX 2000.
Stardock et al., "What Can It Do? Making Objects", DesktopX Tutorial, 2001, [online] [Retrieved on Apr. 11, 2008] Retrieved from the Internet URL:http://web.archive.org/web/2001101922285/http://www.stardock.com/products/desktopx/.
Stardock News, DesktopX User Manual On-line:, 1999, 2003 [online] [Retrieved from the Internet on May 11, 2007] <URL:http://www.stardock.comnewsitem.asp?id=538>.
Stardock, "DesktopX Whitepaper and users Guide" Retrieved from the Internet <URL:http://www.stardock.net/media/whitepaper_desktopx.html>, 1999, 72 pages.
Tang, J.C. et al., "ConNexto Awarenex: Extending Awareness to Mobile Users," SIGCHI '01, AMC, Mar. 31-Apr. 4, 2001, 8 pages.
Ullenboom, C., "Java is auch eine Insel," 2003, [online] [Retrieved on Apr. 13, 2006] Retrieved from the Internet URL: http://www.galileocomputing.de/openbook/javainse12//java_140000.htm#Xxx998138, 3 pages.
Wardell, "Konfabulator for Windows", Jan. 10, 2004, Retrieved from the Internet on Mar. 6, 2006, URL: http://www.xpthemes.com/forums.aps?MID=19&CMID=19&AID=4472, 6 pages.
Partial Interntional Search Rpeort, dated May 15, 2009, issued in Interntional Application No. PCT/US2008/050047.
Invitation to Pay fees and Partial International Search Report, dated May 8, 2009, issued in PCT/US2008/050038.
Archive of BabelFish.com Inc., Oct. 2003, [online] [Archived by http://archive.org on Oct. 2, 2003; retrieved on Dec. 8, 2008] Retrieved from the Internet URL: <http://web.archive.org/web/20031002115902/www.babelfish.com/en/index.html>.
Starfish Software Introduces Starfish Internet Sidekick; Starfish Internet Sidekick is the best way for Internet users to manage their calendar, contacts and communications, Busienss Wire, Sep. 23, 1996, [online] [Retrieved on Dec. 8, 2008] Retrieved from the Internet URL: <http://findarticles.com/articles/mi_mOEIN/is_1996_Sept_23/ai_18704672?tag=rel.res1>.
Archive of www.gigaplex.com, Lazar Productions, Nov. 1996, [online] [Archieved by http://archive.org on Nov. 5, 1996; retrieved on Dec. 8, 2008] Retrieved from the Internet URL: <http://web.archive.org/web/19961105081827/www.gigaplex.com/>.
Archive of movies.com, Jan. 2002, [online] [Archived by http://archive.org on Jan. 18, 2002; Retrieved on Dec. 8, 2008] Retrieved from the Internet URL: <http://www.archive.org/web/20020118102516/movies.go.com>.
Baratz et al., "DesktopX 3/1", ARS Technica, Nov. 17, 2005, [online] [Retrieved on Aug. 1, 2008] Retrieved from the Internet URL: <http://arstechnica.com/reviews/apps/desktopx/ars.>.
Siracusa et al., "Mac OA 10.4 Tiger: Dashboard", Apr. 28, 2005, [online] [Retrieved on Aug. 1, 2008] Retrieved from the Internet URL: <http://arstechnica.com/reviews/os/macosz-10-4.ars/17>.
Wardell et al. "Apple's Dashboard vs. Konfabulator vs. DesktopX", Skinning the frog, Jul. 1, 2004, [online] [Retrieved on Aug. 1, 2008] Retrieved from the Internet URL: <http://frogboy.joeuser.com/article/19800>.
Thomas et al., "Animating Widgets in the InterViews Toolkit", Lecture Notes in Computer Science, pp. 26-44, 1995.
VMWare, "VMWare Workstation User's Manual", 2002, pp. 12-13.
JavaBoutique, Oct. 1, 2002. Available at: <http://javaboutique.internet.com/utilities/counter.html>.
Forstall et al., U.S. Appl. No. 12/469,555, filed May 20, 2009.
Louch et al., "Multidimensional Widgets", U.S. Appl. No. 12/612,301, filed Nov. 4, 2009.
International Search Report and Written Opinion, dated Oct. 16, 2009, issued in International Application No. PCT/US2008/070217.
Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.
Warren, "The VMware Workstation 5 Handbook", Jun. 2005, Course Technology PTR, 50 pages.

(56) References Cited

OTHER PUBLICATIONS

Javaboutique. Oct. 8, 2008. Available at: http://web.archive.org/web/20021208051951/http://javaboutique.internet.com/utilities/counter.html.

Ullenboom, "Java is auch eine Insel," 2003, [online] [Retrieved on Apr. 13, 2006]; Retrieved from the Internet URL: http://www.galileocomputing.de/openbook/javainse12//java_140000.htm#Xxx998138, 3 pages.

Bauer, "Transparent User Modeling for a Mobile Personal Assistant," LWA 2004: Lemen-Wissensentdecking-Adaptivitat, [Online] Oct. 6, 2004, pp. 3-8, Berlin Retrieved from the Internet: URL:http://www.dfki.de/specter/Docs/Bauer04.pdf> [retrieved on Sep. 15, 2009].

Bauer and Deru, "Motion-Based Adaptation of Information Services for Mobile Users," Lecture Notes in Computer Science, Aug. 19, 2005, Retrieved from the Internet, URL: http://www.springerlink.com/content/lwdvxw9ervxa4419/fulltext.pdf>, [retrieved on Sep. 15, 2009], 6 pages.

Lieberman and Selker, "Agents for the User Interface," Handbook of Agent Technology, 2003, pp. 1-20, Retrieved from the Internet, URL: http://web.media.mit.edu/{lieber/Publications/Agents_for_UI.pdf> [retrieved on Sep. 15, 2009].

eHow, VMWare, http://www.ehow.com/how_6368_minimize-window.html, "How to Minimize a Window," Jun. 2004.

Grundy, "An environment for developing adaptive, multi-device user interfaces," AUIC '03 Proceedings of the Fourth Australasian User Interface Conference on User Interfaces, 2003, vol. 18, Australian Computer Society, Inc., Darlinghurst, Australia.

Horvitz et al., "The Lumiere Project: Bayesian User Modeling for Inferring the Goals and Needs of Software Users," Fourteenth Conference on Uncertainty in Artificial Intelligence, Madison, WI, Jul. 1998, Morgan Kaufman Publishers, pp. 256-265.

Silicon Graphics, Inc., "IRIX Interactive Desktop User Interface Guidelines," 2001, Chapter 3, 26 pages.

Gabbard et al., "User-Centered Design and Evaluation of Virtual Environments," Nov./Dec. 1999, IEEE Computer Graphics and Applications, pp. 51-59.

\* cited by examiner

LINKED WIDGETS

RELATED APPLICATIONS

This application is related to the following jointly owned and patent applications, each incorporated herein by reference in its entirety:

U.S. Provisional Patent Application No. 60/583,125, for "Procedurally Expressing Graphic Objects for Web Pages," filed Jun. 25, 2004;

U.S. patent application Ser. No. 10/874,829, for "User Interface for Assisting in the Installation of an Asset," filed Jun. 22, 2004;

U.S. patent application Ser. No. 10/877,968, for "Unified Interest Layer For User Interface," filed Jun. 25, 2004;

U.S. patent application Ser. No. 11/148,010, for "Preview and Installation of User Interface Elements in a Display Environment," filed Jun. 7, 2005;

U.S. Provisional Patent Application No. 60/734,016, for "Preview Including Theme Based Installation of User Interface Elements In A Display Environment," filed Nov. 4, 2005, which provisional patent application is incorporated herein by reference in its entirety;

U.S. Provisional Patent Application No. 60/730,956, for "Widget Security," filed Oct. 27, 2005, which provisional application is incorporated herein by reference in its entirety;

U.S. patent application Ser. No. 11/282,110, for "Preview Including Theme Based Installation of User Interface Elements In A Display Environment," filed Nov. 16, 2005;

U.S. Provisional Patent Application No. 60/737,899, for "Management of User Interface Elements In A Display Environment," filed Nov. 18, 2005; and U.S. patent application Ser. No. 11/346,603, for "Multiple Dashboards," filed Feb. 1, 2006.

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed and accessed through a user interface, such as a "dashboard layer," which is also referred to as a "dashboard." Widgets and dashboards are described in co-pending U.S. patent application Ser. No. 10/877,968, entitled "Unified Interest Layer For User Interface."

Due to the large number of widgets available to a user, a virtual desktop or dashboard can become cluttered and disorganized, making it difficult for the user to quickly locate and access a widget. Moreover, the user may have to invoke multiple widgets to perform a single task, which can lead to an inefficient use of widget resources. In some cases, the user may not readily recognize the relationship between two widgets, which leads to additional inefficiencies when using widgets.

SUMMARY

Systems, methods, computer-readable mediums, user interfaces and other implementations are disclosed for linking widgets by detecting a trigger event associated with a first widget, and providing access to a second widget in response to the trigger event. The trigger event can be the downloading, previewing, installation and/or launching of a widget. The trigger event can also be the exercise of a function or feature of a widget. In some implementations, a communication path or channel is established between widgets for sharing information. In other implementations, linked widgets are provided access to shared information. A widget link manager can be used to establish links between widgets and to designate shared information, restrictions, etc.

In some implementations, a method of linking widgets includes: providing a first widget; providing a second widget; and linking the first and second widgets.

In some implementations, a method of linking widgets includes detecting a trigger event associated with a first widget, and providing access to a second widget in response to the trigger event.

In some implementations, a method of linking widgets includes: interacting with a first widget; generating a first output from the first widget in response to the interaction; interacting with a second widget linked to the first widget; and generating a second output from the second widget based at least in part on the first output from the first widget.

In some implementations, a method of linking widgets includes: generating a list of link information for a plurality of widgets; selecting a widget for linking; determining a set of widgets available for linking with the selected widget based on the link information; and linking the selected widget with at least one widget in the set of widgets.

In some implementations, a widget linking system includes a widget link manager for establishing an available link between a first widget and a second widget, and a widget linker for linking the first widget with the second widget.

In some implementations, a method of linking widgets includes: selecting a first widget; determining a first set of information that can be shared by the first widget; selecting a second widget; determining a second set of information that can be shared by the second widget; linking the first and second widgets; and establishing communication between the first and second widgets for sharing the first and second sets of information.

Other implementations are disclosed which are directed to systems, methods, computer-readable mediums and user interfaces.

DETAILED DESCRIPTION

Hardware Architecture

Figure 1:
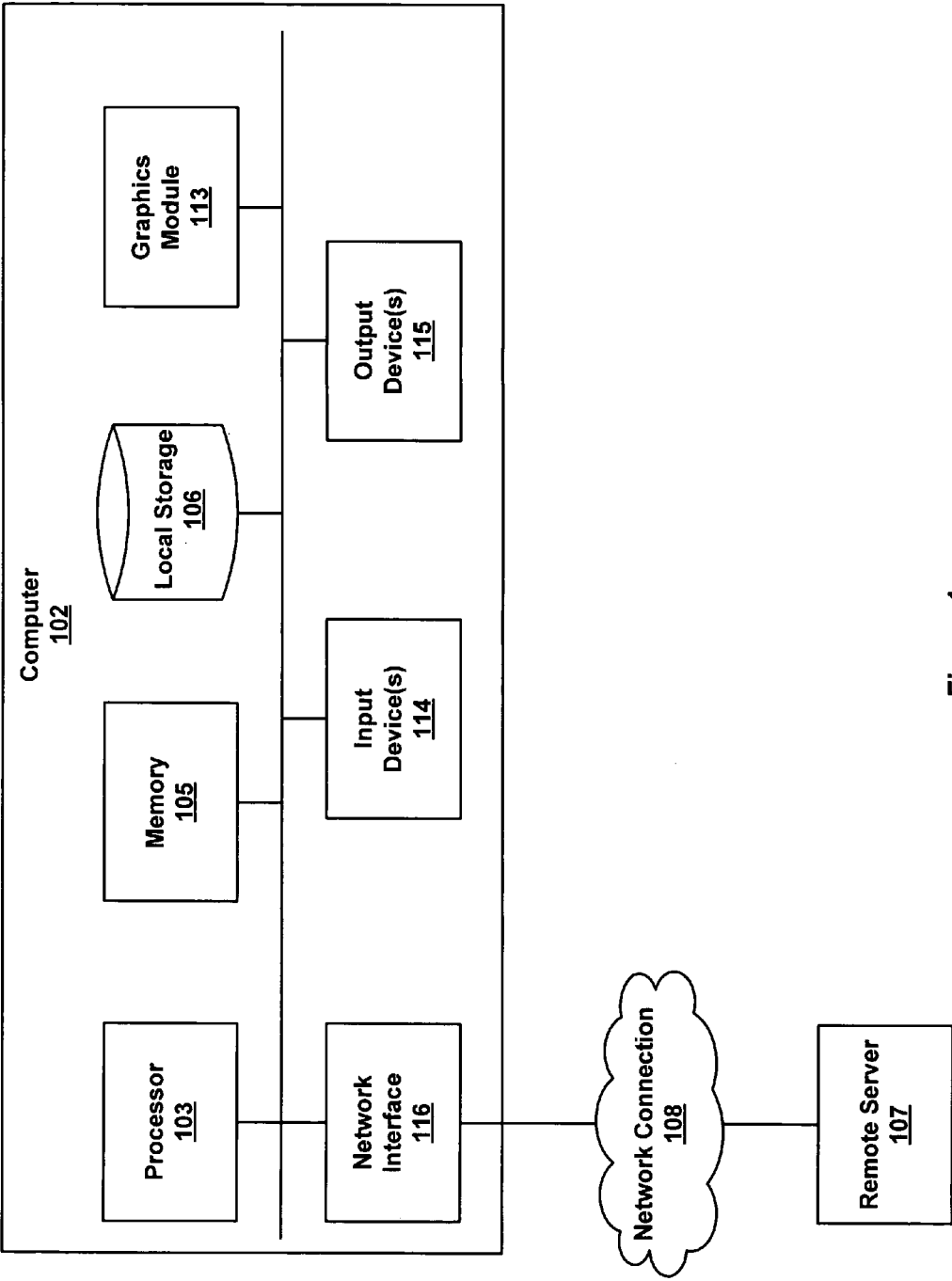
FIG. 1 is a block diagram of a hardware architecture for implementing dashboards.

FIG. 1 is a block diagram of a hardware architecture 100 for implementing linked widgets. The architecture 100 includes a personal computer 102 coupled to a remote server 107 via a network interface 116 and a network connection 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While linked widgets are described herein with respect to a personal computer 102, it should be apparent that the disclosed implementations can be incorporated in, or integrated with, any electronic device that is capable of using widgets, including without limitation, portable and desktop computers, servers, electronics, media players, game devices, mobile phones, email devices, personal digital assistants (PDAs), televisions, etc.

A dashboard system and method for managing and displaying dashboards and linked widgets can be implemented as one or more plug-ins that are installed and run on the personal computer 102. The plug-ins can be configured to interact with an operating system (e.g., MAC OS® X, WINDOWS XP, LINUX, etc.) and to perform the various dashboard and widget functions, as described with respect of FIGS. 2-8. The dashboard system and method can also be implemented as one or more software applications running on a computer system (e.g., computer 102). In some implementations, a dashboard system can be another widget that is configurable to communicate with other widgets, applications and/or operating systems. The dashboard system and method can also be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

For illustrative purposes, widgets (including linked widgets) are described as a feature of an operating system. Linked widgets, however, can be implemented in other contexts as well, including e-mail environments, desktop environments, application environments, hand-held display environments, and any other display environments.

Dashboard Overview

Figure 2:
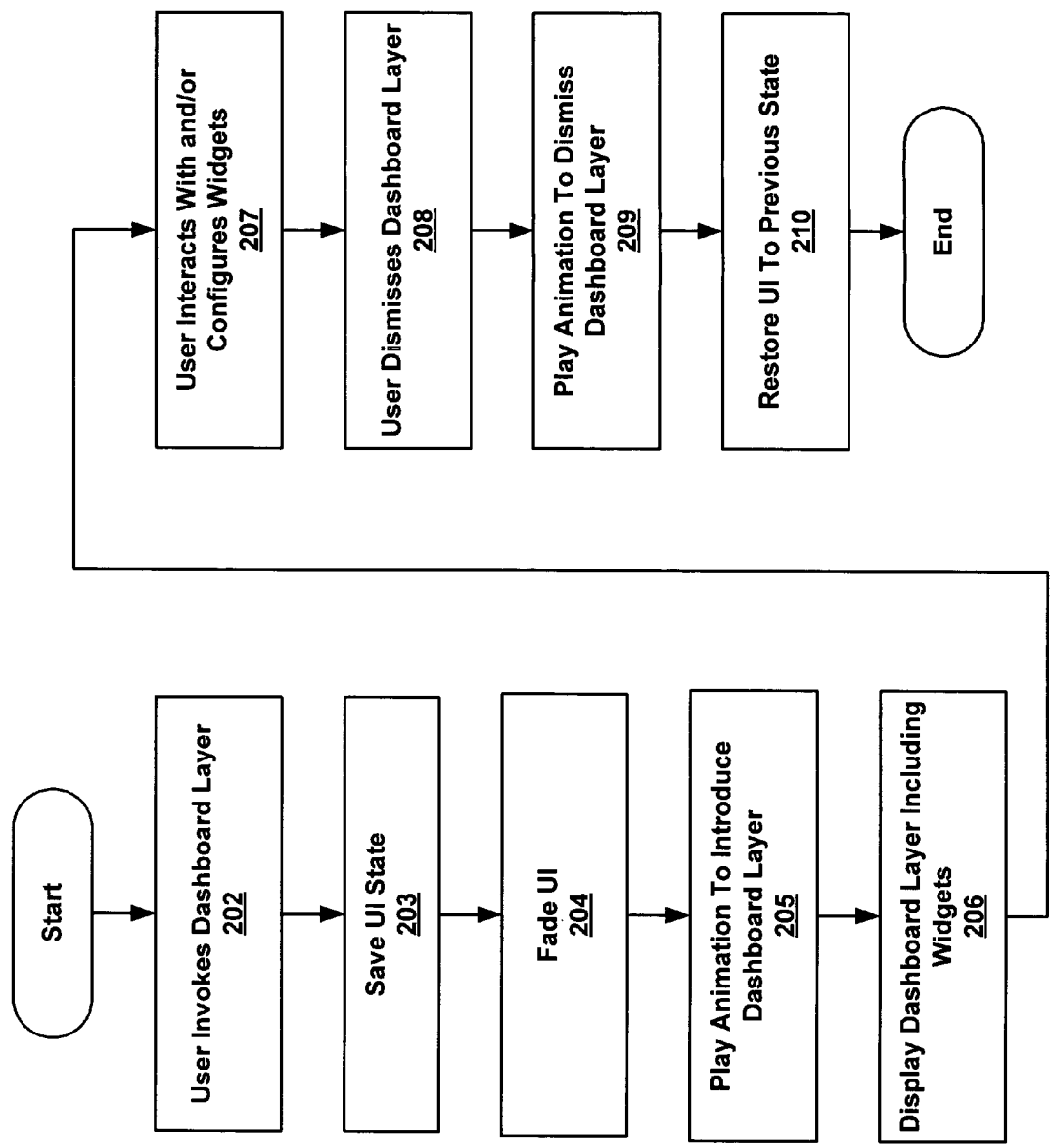
FIG. 2 is a flow diagram of a process for activating and using a dashboard.

FIG. 2 is a flow diagram of an implementation of a process for activating and using one or more dashboard layers. A dashboard layer (also referred to herein as a "unified interest layer" or "dashboard") is used to manage and display widgets (including linked widgets). A user can invoke a dashboard (202) by hitting a designated function key or key combination, or by clicking on an icon, or by selecting a command from an onscreen menu, or by moving an onscreen cursor to a designated corner of the screen. Alternatively, a dashboard layer can be invoked programmatically by another system, such as an application or an operating system, etc.

In response to such invocation, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration.

In some implementations, the dashboard is overlaid on an existing user interface (UI) (e.g., a desktop UI). When the dashboard is activated, the existing UI may be faded, darkened, brightened, blurred, distorted, or otherwise altered to emphasize that it is temporarily inactivated. The existing UI may or may not be visible behind the dashboard. The UI can also be shrunk to a small portion of the display screen while the dashboard is active, and can be re-activated by clicking on it. In some implementations, the UI is shrunk and presented as a widget. The UI can be re-activated by clicking on the widget. In some implementations the UI remains active when the dashboard is active.

The user interacts with and/or configures widgets as desired (207). In some implementations, the user can move widgets around the screen, and can resize widgets if applicable. Some widgets are resizable and some have a fixed size. A widget author can specify whether a widget can be resized. Some widgets automatically resize themselves based on the amount or nature of the data being displayed. Widgets can overlap and or repel one another. For example, if the user attempts to move one widget to a screen position occupied by another widget, one of the widgets is automatically moved out of the way or repelled by the other widget. In some implementations, a user can link widgets together using a widget link manager, as described with respect to FIG. 8.

In some implementations, the user dismisses the dashboard (208) by invoking a dismissal command, which causes the UI layer to return or re-present itself to the display screen. In some implementations, the dashboard is dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a pre-defined corner of the screen. Other dismissal methods are possible.

In some implementations, the dashboard is automatically dismissed (i.e., without user input) after some predetermined period of time or in response to a trigger event. An animation or other effect can be played or presented to provide a transition as the dashboard is dismissed (209). When the dashboard is dismissed, the current configuration or state of the widgets (e.g., position, size, etc.) is stored, so that it can be retrieved the next time the dashboard is activated. In some implementations, an animation or effect is played or presented when re-introducing the UI. The UI is restored to its previous state (210) so that the user can resume interaction with software applications and/or the operating system.

In some implementations, the dashboard is configurable. The user can select a number of widgets to be displayed, for example, by dragging the widgets from a configuration bar (or other user interface element) onto the dashboard. The configuration bar can include different types of widgets, and can be categorized and/or hierarchically organized. In some implementations, in response to the user dragging a widget onto the configuration bar, the widget is downloaded from a server and automatically installed (if not previously installed). In some implementations, certain widgets can be purchased, so the user is requested to provide a credit card number or some other form of payment before the widget is installed on the user's device. In some implementations, widgets are already installed on the user's device, but are only made visible when they have been dragged from the configuration bar onto the dashboard. The configuration bar is merely an example of one type of UI element for configuring the dashboard. Other configuration mechanisms can be used, such as an icon tray or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets.

Software Architecture

Figure 3:
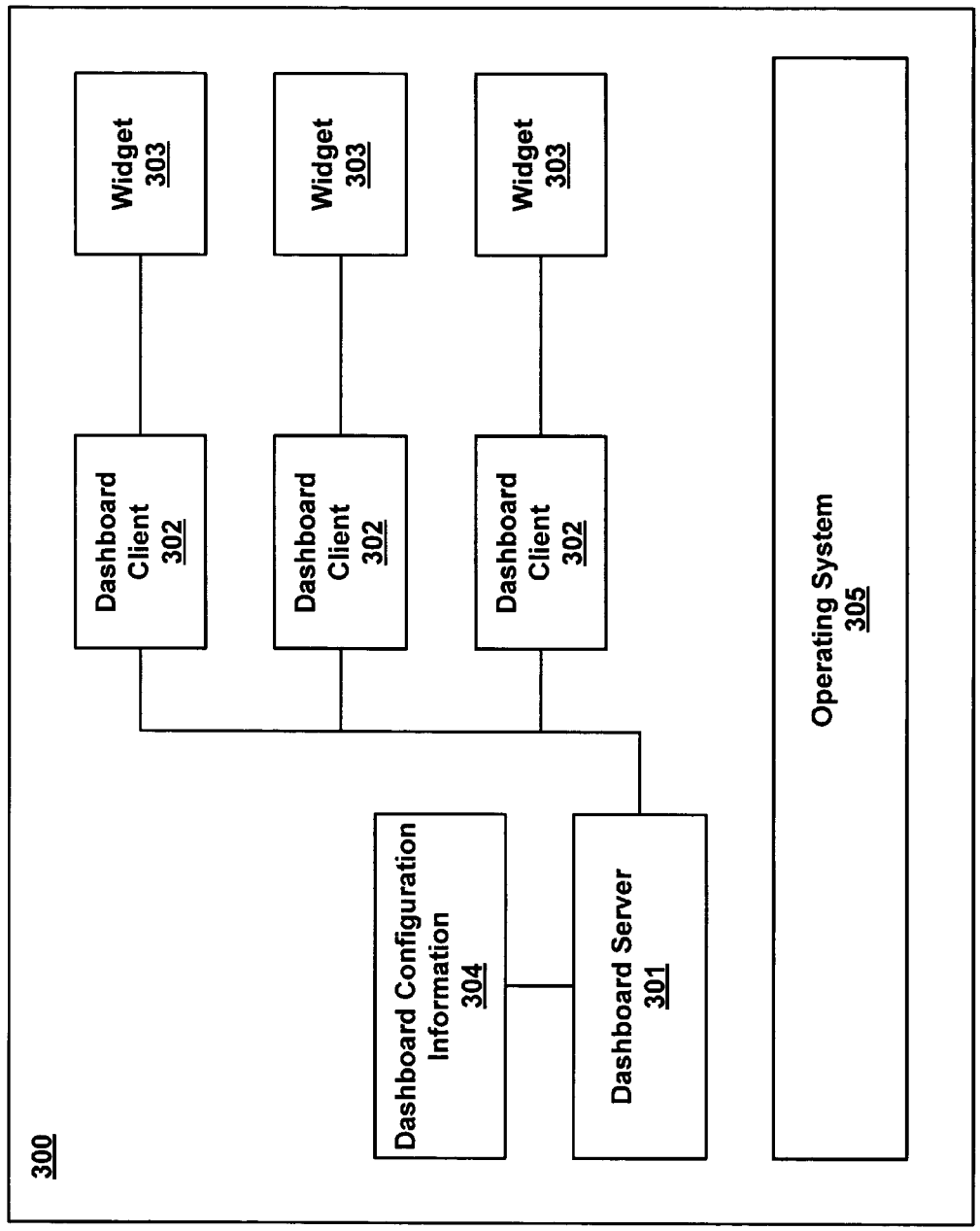
FIG. 3 is a block diagram of a software architecture for implementing dashboards.

FIG. 3 is a block diagram of a software architecture 300 for implementing dashboards for installing, displaying and launching linked widgets. The software architecture 300 generally includes a dashboard server 301, one or more dashboard clients 302, one or more widgets 303 and an operating system 305. The server 301 and/or clients 302 use dashboard configuration information 304 to specify configuration options for displaying the widgets 303, including access levels, linking information and the like (if applicable). Such configuration information can include information for two or more dashboards configured by the same user or by different users.

In some implementations, the widgets 303 are displayed using HTML and related web technology. The dashboard server 301 manages and launches the dashboard client 302 processes. Each dashboard client 302 loads a widget 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. The dashboard clients 302 display their respective widgets 303 by rendering web pages into a "WebView," as described in U.S. patent application Ser. No. 11/148,010, entitled "Preview and Installation of User Interface Elements in a Display Environment." The size of each WebView can be defined as metadata associated with the corresponding widget 303. The server 301 provides data for rendering the dashboard layer that can be overlaid on a desktop user interface. In some implementations, the widgets 303 are rendered into the dashboard layer, which is drawn on top of the desktop user interface, so as to partially or completely obscure the desktop user interface while the dashboard layer is active.

Dashboard Server

The dashboard server 301 (also referred to as "server") can be a stand-alone process or embedded in another process. The server 301 can be located at the computer 102 or at the remote server 107. In some implementations, the server 301 provides functionality for one or more processes, including but not limited to: non-widget UI management, window management, fast login, event management, loading widgets, widget arbitration, Core Image integration and widget preference management, as described in U.S. patent application Ser. No. 11/148,010, entitled "Preview and Installation of User Interface Elements in a Display Environment."

Dashboard Client

In some implementations, a dashboard client 302 is a process that uses, for example, objects that are defined as part of a development environment, such as Apple Computer's Cocoa Application Framework (also referred to as the Application Kit, or AppKit) for the Mac OS® operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describes a widget 303 and provides an identifier for a widget 303. Table I provides an example of Info.plist file contents.

TABLE I

Example of Info.plist File Contents

| Key | Type | Description/Value |
| --- | --- | --- |
| CFBundleIdentifier | CFString | com.apple.widget.<widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of default PNG file. |
| Plugin (optional) | CFString | Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |
| AllowNetworkAccess | Boolean | Access to any resources that are not file based. |
| AllowSystem | Boolean | Access to command-line utilities using widget script object. |
| WidgetLinkInfo | CFString1 ... CFStringN | Names of widgets that can be linked |

The keys AllowFileAccessOutsideofWidget, AllowFullAccess AllowInternetPlugins, AllowJava, AllowNetworkAccess, and AllowSystem are Boolean types that can be set by a widget author to enable certain levels of resource access.

In some implementations, the Info.plist file includes N WidgetLinkInfo strings, for storing the names of widgets that can be linked to the widget associated with the Info.plist file. This information can be used to automatically link widgets, as described with respect to FIGS. 5-8. Note that the additional widget link information can be included in the Info.plist file and/or one or more other files bundled with the widget, depending upon the widget design.

Dashboard Invocation

Figure 4A:
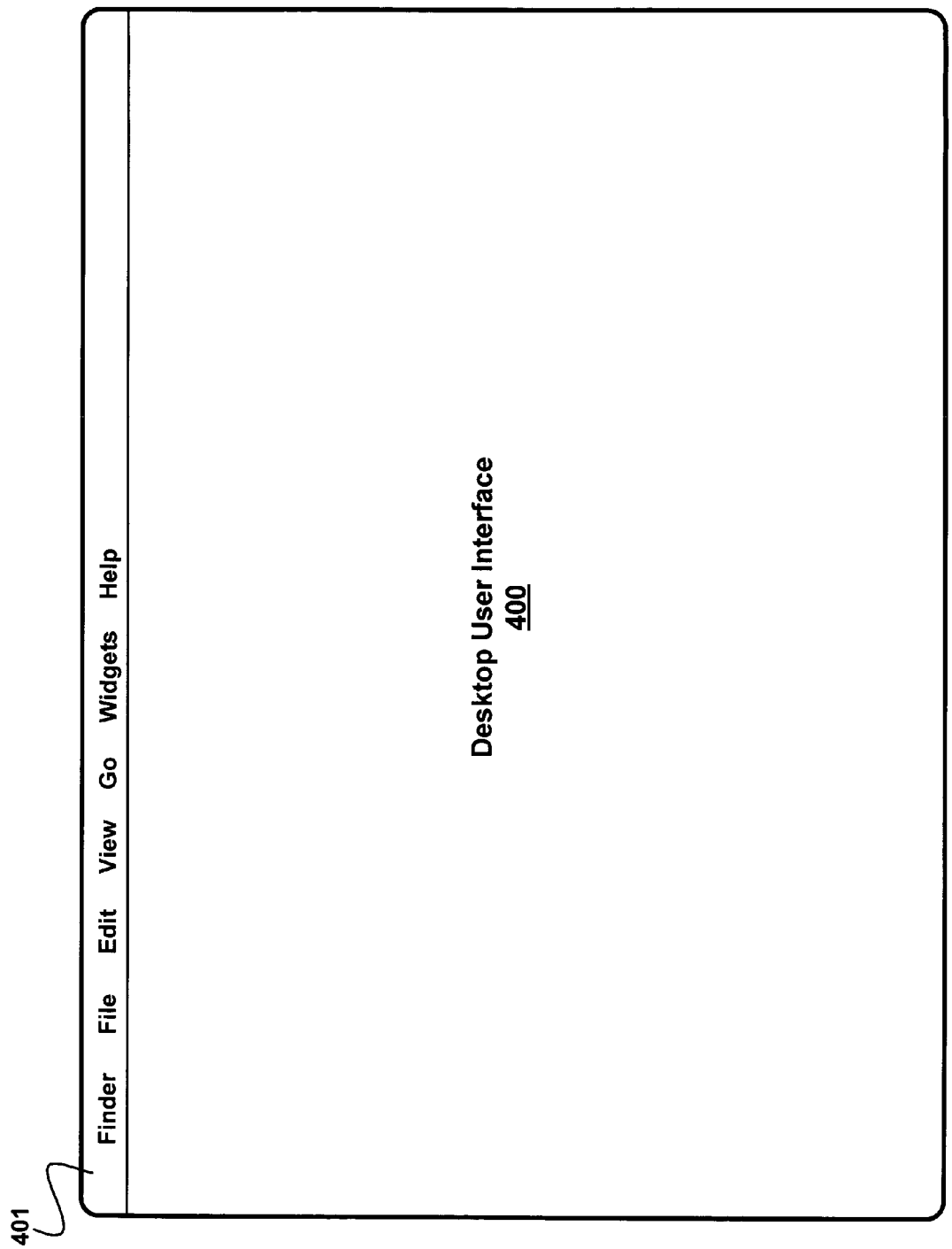
FIG. 4A is a screen shot depicting a desktop user interface prior to activation of a dashboard.

FIG. 4A depicts a desktop user interface 400 prior to activation of a dashboard. The desktop user interface 400 (also referred to herein as "desktop") is a conventional user interface as may be provided by an operating system, such as Mac OS®. The desktop 400 has a background image, menu bar 401, and other standard features. As is known in the art, the desktop 400 may also include windows, icons, and other elements (not shown). The user activates the dashboard by selecting an item from a menu, or by clicking on an icon, or by pressing a function key or key combination, or by some other means for invoking activation. A dashboard does not have to be activated on a desktop; rather the dashboard can be activated and displayed on any display screen with or without a desktop.

Figure 4B:
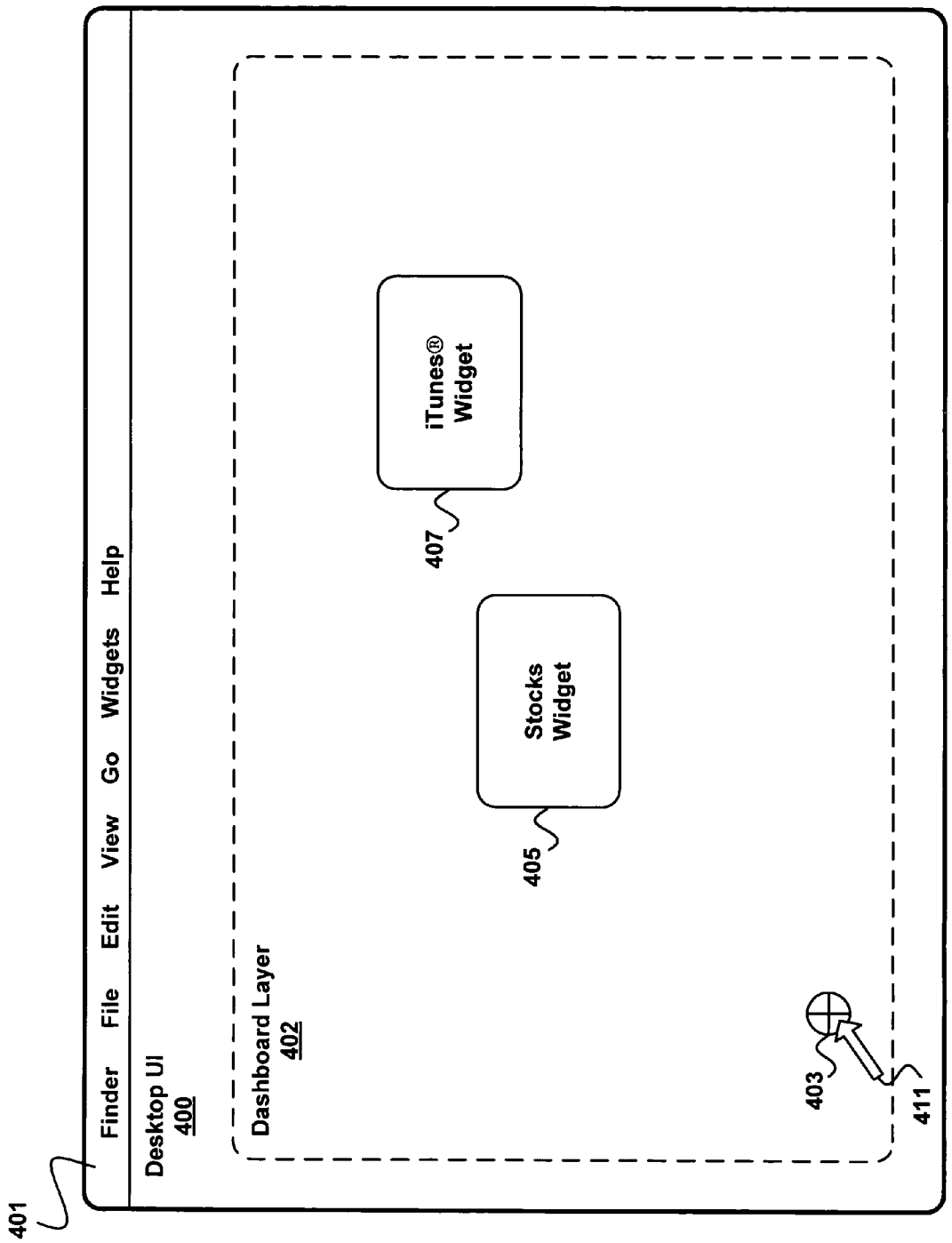
FIG. 4B is a screen shot depicting an initial state for a dashboard.

FIG. 4B depicts an initial state for a dashboard layer 402. In some implementations, a configuration bar icon 403 is initially displayed. Alternatively, upon activation the dashboard layer 402 can display one or more default widgets 405, 407. If the dashboard layer 402 has previously been activated and configured, the widgets 405, 407, can be displayed as previously configured. The dashboard layer 402 is not necessarily visible as a distinct layer. However, its various components (such as widgets, icons, and other features) are visible. In some implementations, these components are displayed in a transparent layer, thus maintaining the visibility of the desktop 400 to the user. In some implementations, the desktop 400 and its components are darkened (or blurred, or otherwise visually modified) while the dashboard layer 402 is active, so as to emphasize that the desktop 400 is temporarily inactive. In other implementations, the desktop 400 is not visible while the dashboard layer 402 is active. The user can reactivate the desktop 400 and dismiss the dashboard layer 402 by, for example, selecting on an area of the screen where no dashboard element is displayed (i.e., "negative space"). In some implementations, other commands, key combinations, icons, or other user input can be used to dismiss the dashboard layer 402.

Figure 4C:
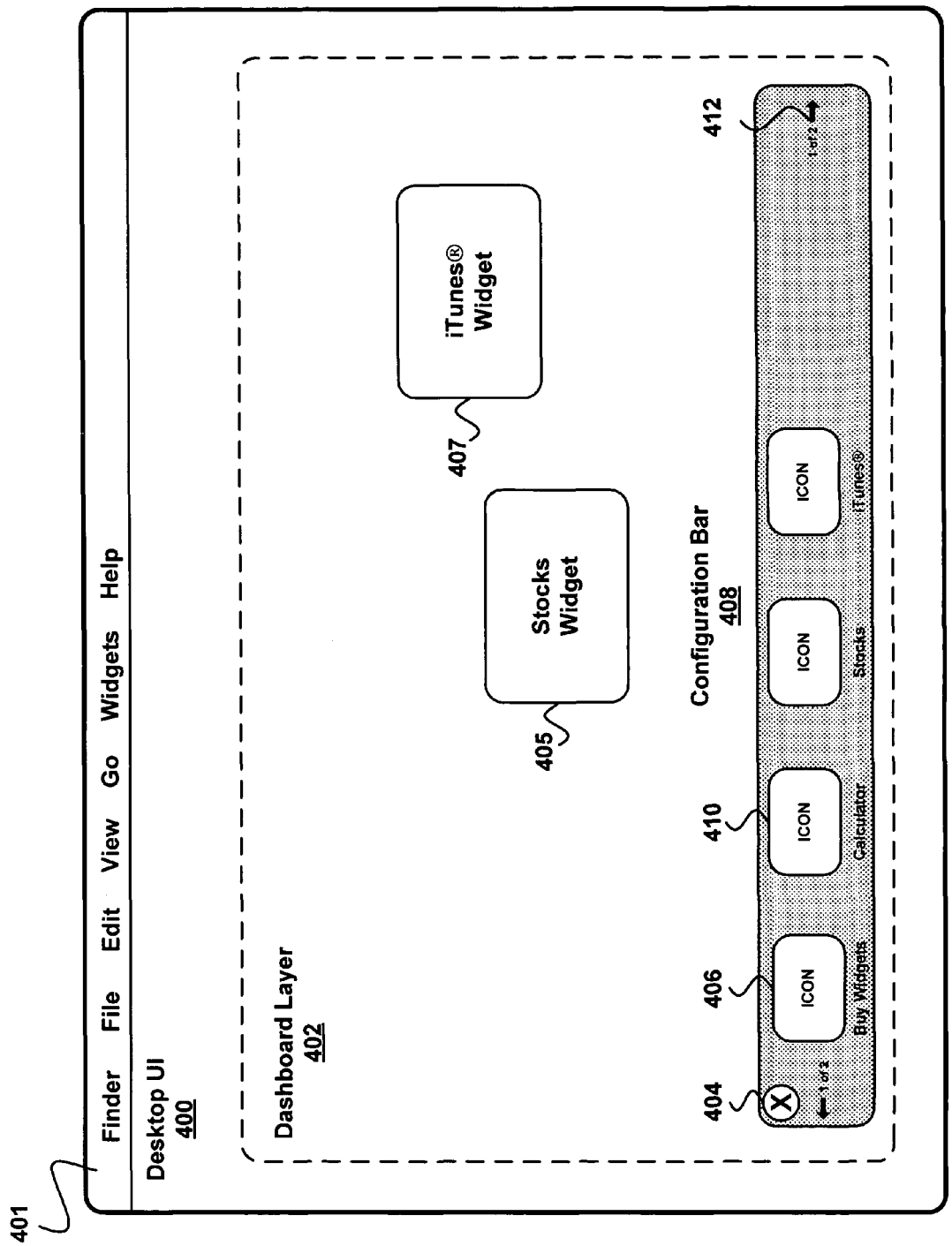
FIG. 4C is a screen shot depicting a configuration bar for a dashboard.

In some implementations, the user can drag the icon 403 to any location on the screen, and the position of the icon 403 will remain persistent from one invocation of the dashboard layer 402 to the next. The user can click on the icon 403 to activate the configuration bar 408, as shown in FIG. 4C. The configuration bar 408 provides access to various widgets that can be placed on the dashboard. In some implementations, a text label is shown for each available widget (e.g., calculator, stocks, iTunes®, etc.). In some implementations, an icon is shown for each available widget (e.g., calculator icon 410). If many widgets are available, the widgets may be arranged hierarchically by type (e.g., game widgets, utility widgets, etc.), or alphabetically, or by any other categorization methodology. For example, a number of categories may be displayed, and clicking on one of the categories causes a pull-down menu to be displayed, listing a number of widgets in that category. In some implementations, a buy widget 406 is also available, allowing the user to select widgets from an online store or website.

Note that the particular configuration and appearance of configuration bar 408 in FIG. 4C is merely exemplary, and that many other arrangements are possible. For example, widgets can be installed from other locations, other applications or other environments, without requiring that they first be part of the configuration bar 408. The user can dismiss the configuration bar 408 by clicking on dismissal button or icon 404. The configuration bar can include a user interface element 412 for scrolling.

Installation of Elements

Elements, including user interface elements such as widgets can be installed in a display environment as discussed below. One display environment, a dashboard, will be used for illustrative purposes. Installation can include a preview operation as is discussed below. Installation can include selection of the element, such as by a drag and drop action. Other selection means can be used. In one example, a user can drag widgets from configuration bar 408 onto the surface of the dashboard (in other words, anywhere on the screen), using standard drag-and-drop functionality for moving objects on a screen.

Figure 4D:
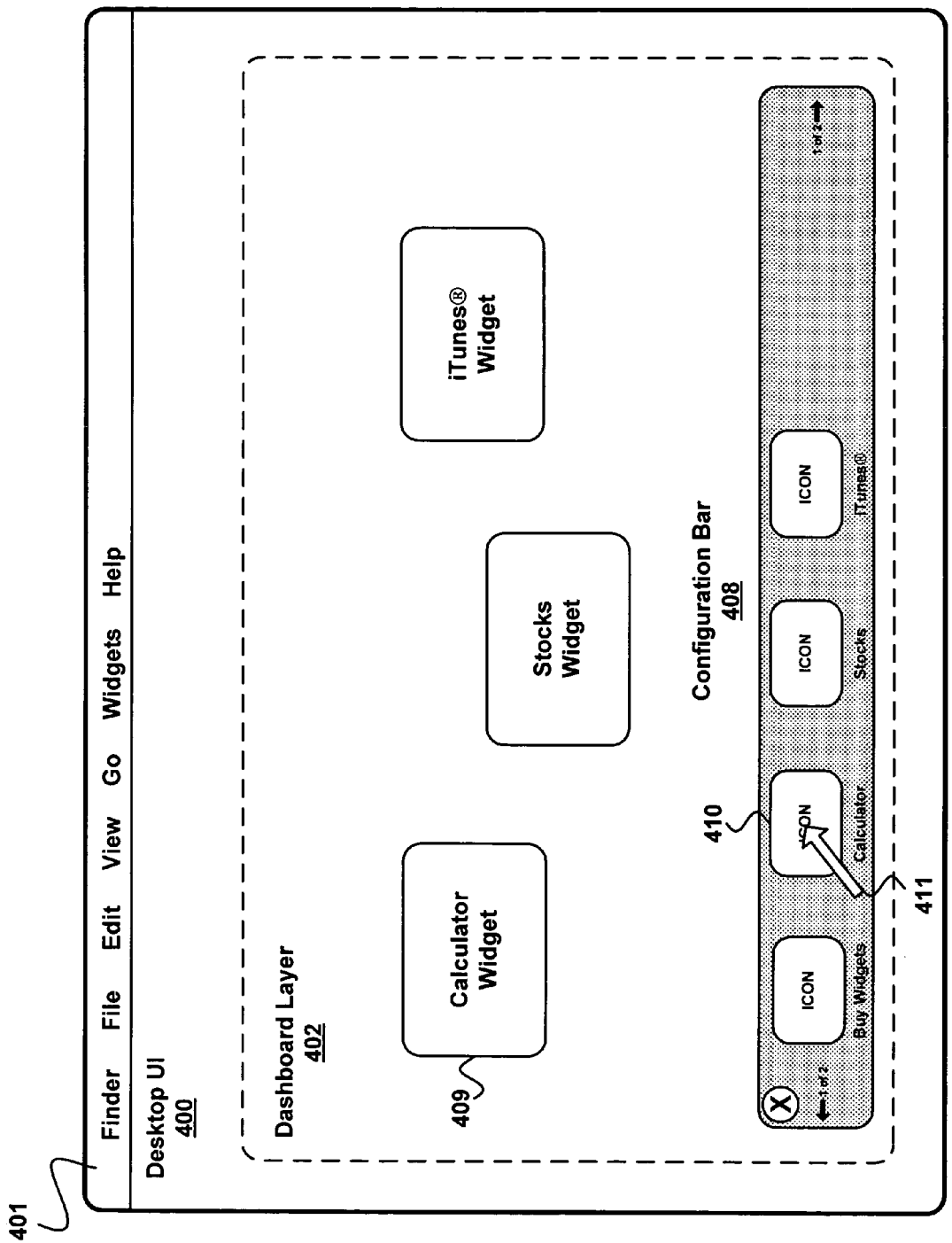
FIG. 4D is a screen shot depicting user selection of a widget from the configuration bar.

FIG. 4D depicts the selection of the calculator widget icon 410 from the configuration bar 408. The calculator icon 410 which is associated with a calculator widget 409 is highlighted, or otherwise augmented or embellished, to indicate that it has been selected by a user with cursor 411.

In some implementations, widgets in the configuration bar 408 are smaller than their actual size when installed. When the user clicks on a widget and begins to drag it into a dashboard or other display environment, the widget can be animated to its actual or installed size to assist the user in the real-time layout of the dashboard. By animating the widget to its actual size, the user will know the actual size of the widget prior to its installation.

In some implementations, an animation, such as a ripple animation, is shown when the user "drops" a widget by releasing a mouse button (or equivalent input device) to place a widget at the desired location. In one implementation, the dragging of the widget to the dashboard layer 402 invokes an installation process for installing the widget including previewing. After installation, the user can move a widget, to any other desired location, or can remove the widget from the screen, for example by dragging it off the screen, or dragging it back onto the configuration bar 408, by invoking a remove command, disabling a widget in a menu associated with a widget manager or canceling the installation during the preview. In some implementations, the position, state, and configuration of a widget are preserved when the dashboard layer 402 is dismissed, so that these characteristics are restored the next time the dashboard layer 402 is activated.

In some implementations, widgets and/or dashboard layers (including widgets) can be installed from within a running application. For example, a widget and/or dashboard (including widgets) can be an attachment to an email. When the user clicks the attachment, an installation process is invoked for the widget and/or dashboard which can also include a preview.

Widgets can be created or instantiated using an installer process. The installer process can include a separate user interface or an integrated user interface (e.g., integrated in the display environment or separate from the display environment, for example, in another display environment associated with another application, such as an email application) for selecting and installing widgets in a display environment. For example, a widget received as an email attachment can be launched by a user from directly within a user interface of the email application.

Widgets can be created or instantiated using an installer process. The installer process can include a separate user interface or an integrated user interface (e.g., integrated in the display environment or separate from the display environment for example in another display environment associated with another application, such as an email application) for selecting and installing widgets in a display environment. Thus, the installation area for the widget can be embedded within an application display area or window. For example, if a user receives a widget as an attachment to an email, the user can invoke and install the widget from within the email message window without the need for a separate installation window.

In general, an installer process is used to provide additional functionality to the creation/instantiation process, beyond the simple drag and drop operation describe above. Additional functionality can include preview, linking, security and deletion functionality in a singular interface. The installer process can be a separate process or combined in another process. The installer process can itself be a separate application that is executable to install widgets (or other elements) in a display environment. As used herein, the term "process" refers to a combination of functions that can be implemented in hardware, software, firmware or the like.

The use of nested display areas associated with different dashboard environments enables users to organize dashboards into hierarchies. For example, a dashboard environment including widgets for use with operating system utilities can include nested display areas for displaying widgets associated with particular types of utilities (e.g., date and time, memory management, network resource management, etc.)

Linked Widgets

Figure 5A:
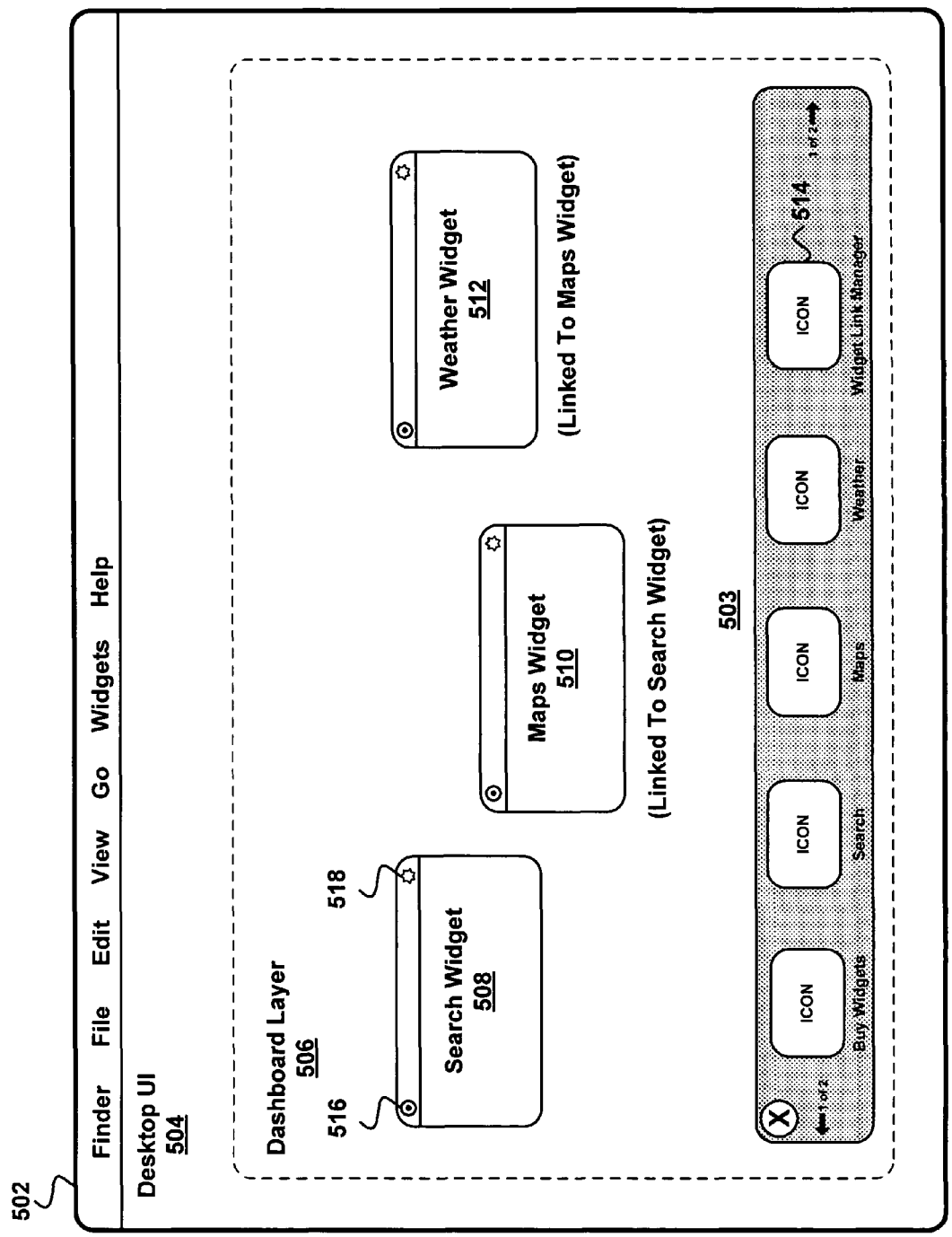
FIG. 5A is a screen shot depicting an implementation of linked widgets.

FIG. 5A is a screen shot depicting an implementation of linked widgets. Linked widgets can be displayed in any display environment, such as a dashboard layer 506 overlaid on a desktop user interface 504. In some implementations, the user interface 504 can be a conventional UI provided by an operating system, such as the Mac OS® or Windows® operating systems.

In some implementations, the user interface 504 includes a background image, a menu bar 502, and other UI common features (e.g., windows, icons, etc.). The user can activate the dashboard layer 506 by selecting an item from the menu bar 502, or by clicking an icon, or by pressing a function key or key combination, or by some other means for invoking activation. In some implementations, a configuration bar 503 is displayed, which includes one or more widget icons and a widget link manager icon 514. The configuration bar 503 can be scrolled from left to right to reveal more widget icons. A user can install a widget by dragging its associated widget icon from the configuration bar 503 and dropping it in the dashboard layer 506, or by using other installation techniques, as described with respect to FIG. 4D.

Automatic Widget Linking

In some implementations, two or more widgets are automatically linked in response to a trigger event. A trigger event can be generated by downloading, installing, previewing, launching, manipulating, updating, operating or otherwise interacting with a widget. A trigger event can also be generated by exercising the functionality of a widget.

Widgets can be automatically or manually linked together based on any suitable criteria or no criteria. For example, widgets can be linked based on the type of data or information the widgets use or share (e.g., time, date, place, etc.), the origin of the widgets (e.g., received from friends, downloaded from a common website, etc.) and the time when the widgets were downloaded (e.g., widgets downloaded at the same time of day). Widgets can be linked based on their membership in a widget class (e.g., financial widgets, stock market widgets, etc.). Widgets can also be linked based on their participation in a process or workflow (e.g., a stock market widget providing data to a 3D graph widget).

The concept of linked widgets can be illustrated by the following example involving a search widget 508, a map widget 510 and a weather widget 512. When the user installs the search widget 508 in the dashboard layer 506, a trigger event is generated which causes the map widget 510 and the weather widget 512 to be automatically linked to the search widget 508 and displayed in the dashboard layer 506. A user enters a search query in a search box of the search widget 508 to determine the location of a favorite restaurant. The search widget 508 returns location information (e.g., address, coordinates, etc.) for the restaurant, which is shared with the map widget 510 and the weather widget 512. The map widget 510 uses the address to generate a map and driving directions. The weather widget 512 uses the address to determine the current weather for the location of the restaurant. If the map and weather widgets 510, 512, are already installed and launched in the dashboard layer 506 when the search widget 508 is installed, then the links are established directly without re-installing and launching the widgets 510, 512. If the widgets 510, 512, are not installed, then the widgets 510, 512 are installed and launched before or after being linked. If the widgets 510, 512 are not available on the computer system 102, a message is displayed instructing the user on how to obtain the widgets 510, 512 from another source. For example, the message can include a link to a website where the widgets 510, 512 can be downloaded to the computer system 102.

Generally, any two widgets can be linked and share information. The amount and type of information shared is dependant on the widgets that are linked. For example, the widgets 508, 510 and 512 could share location information (e.g., address, latitude, longitude, etc.).

The widgets 508, 510 and 512 are examples of widgets that can be linked based on the type of information the widgets use and share (i.e., location information). Other examples of widgets that can be linked include but are not limited to: a calendar widget that can be linked to a scheduling widget; a dictionary widget that can be linked to a word processing widget; a telephone directory widget that can be linked to dial-up widget; a stock widget that can be linked to a graph widget for presenting stock information in different types of graphs (e.g., pie graph, bar graph, etc.); an image processing/editing widget that can be linked to a picture frame widget for viewing a digital image; and a media player widget that can be linked to a ticket vending widget (e.g., a Ticketmaster™ widget) for providing a touring schedule and a mechanism for purchasing concert tickets to see an artist whose song is currently playing in the media player widget.

In some implementations, widgets can be linked to one or more non-widget applications and can interact with and receive data from those applications. A non-widget application can also provide a bridge between two or more widgets. For example, when an application is invoked (e.g., a word processor) can search for widgets that can support the application or specific feature of the application (e.g., dictionary or thesaurus widgets). The widgets can communicate directly with each other and/or indirectly through the application.

In some implementations, links are established between widgets only if one or more conditions, events or triggers are satisfied. For example, a link may only be established upon completion of one or more tasks, or at a certain time of day, or only between widgets that are currently running, or only between widgets in the same dashboard layer, etc. The conditions for establishing links can be a set of rules that should be satisfied before a link is established. The rules can be generated manually by the user or programmatically at run time. Rules can also be dynamically generated by a running widget or non-widget application that is associated with widgets. The rules can be stored in a widget file or other data structure. The rules for linking widgets can be different based on the type of device where the widgets reside (e.g., a portable device, mobile phone, etc.).

Linked widgets can be located in the same dashboard or different dashboards in a multiple dashboard environment. In some implementations, linked widgets can communicate even when installed in different display environments. Linked widgets can reside on a single device or on multiple devices and communicate over a network connection established between the devices (e.g., Internet, Ethernet, wireless, etc.).

In some implementations, linked widgets include a link element 516 (e.g., a button), which if selected disables links to other widgets. For example, clicking on the link element 516 of the search widget 508 causes the map and weather widgets 510, 512, to be unlinked to the search widget 508. In some implementations, when widgets are unlinked they are altered or obfuscated in the dashboard layer 506 (e.g., grayed out, dimmed, made semi-translucent, etc.). Alternatively, unlinked widgets can remain visible but a link indicator 518 (e.g., a virtual lamp, etc.) is altered to indicate a widget's link status. For example, the link indicator 518 can change color (e.g., from green to red) to assist users to visually identify the link status of a widget. In other implementations, the icon associated with a widget is modified to indicate the widgets link status (e.g., the icon change colors or displays informative text).

In some implementations, widgets that are linked (or that are capable of being linked) have a gravitational or magnetic attraction or repulsion to each other. For example, when two widgets are linked together, the widgets positions in a dashboard layer or other user interface can be automatically adjusted so the linked widgets are adjacent or proximate to each other. Under such a simulated gravitational attraction or repulsion, widgets can cluster together in the dashboard layer or user interface to indicate their linked status. The clustering visually indicates to the user that the widgets are linked (or not linked) or that the widgets can be linked. A visual indication of the strength of a link (or the potential to link) can be displayed by changing one or more properties of the widgets, such as the color of the widgets or the distance between widgets. For example, red widgets could indicate a strong link (or potential to link) and green widgets could indicate a weak link (or potential to link). Also, a shorter distance between linked widgets in a dashboard layer or user interface could indicate a stronger link (or potential to link) than widgets that are separated by a greater distance. If the user moves a widget around a dashboard layer or a user interface, other widgets in the dashboard layer or user interface can be attracted to or repulsed by the moving widget to indicate their link status or link potential.

Widgets can be linked in a variety of topologies. For example, a single widget can be linked to multiple widgets and configured to provide those widgets with common or personalized information (e.g., a broadcasting widget). In some implementations, a widget can behave like a server ("server widget") and interact and exchange information with one or more "client" widgets.

In some implementations, widgets can be linked at several levels and conceptually organized into a widget hierarchy, for example, forming a "tree" structure where the widget at the top of the tree is a "root" widget and the other widgets are "leafs" or "node" widgets.

In some implementations, the linkage between two or more widgets can be bi-directional, so that each widget in a pair of linked widgets can be invoked (e.g., launched, installed, updated, etc.) by the other widget in the pair. Also, each widget in a widget pair can transmit and receive information from the other widget in the pair.

In some implementations, the user interface 504 can be obfuscated to reveal a dashboard layer 506 containing only linked widgets. For example, the user can press a predetermined key combination or other input mechanism, which causes the appearance of unlinked widgets to be altered or otherwise obfuscated so that only linked widgets are visible on the display screen. A key combination can be specified by the user in a preference pane or other user input mechanism.

Figure 8:
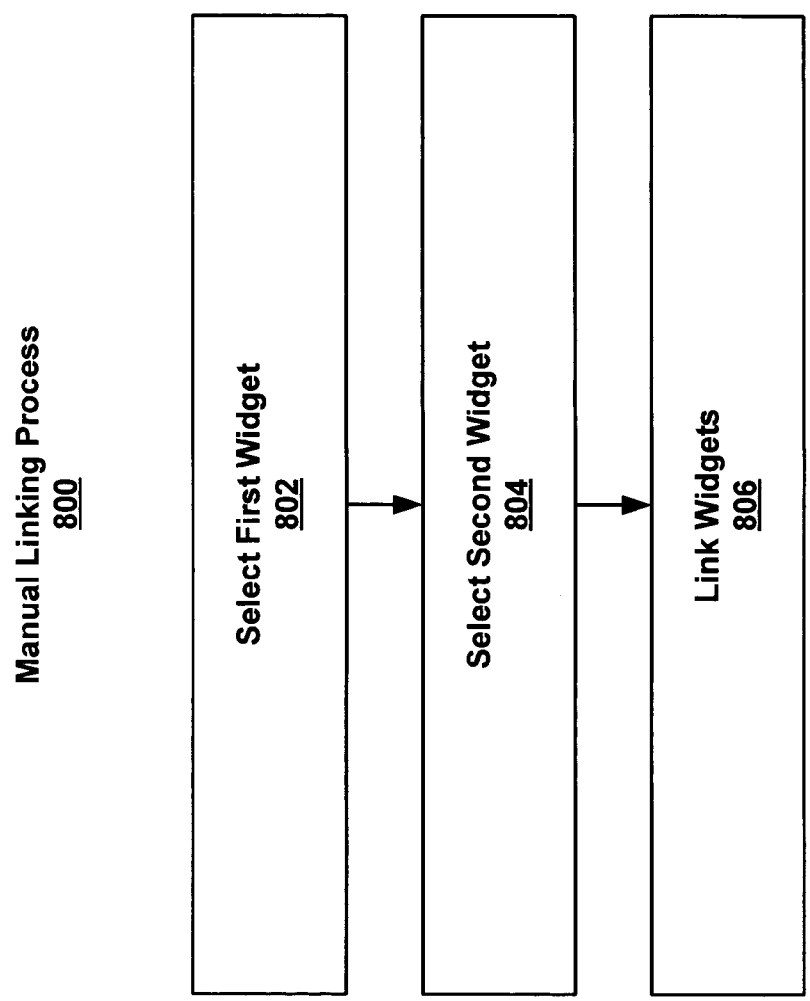
FIG. 8 is a flow diagram of an implementation of a manual widget linking process.

In some implementations, a widget link manager enables a user to manually establish and edit widget links, as described with respect to FIG. 8. A widget link manager icon 514 for invoking the widget link manager can reside anywhere in the desktop user interface 504 and/or in the configuration bar 503, as shown in FIG. 5A. The icon 514 can be used to toggle between a dashboard layer or desktop and a user interface for the widget manager.

Figure 5B:
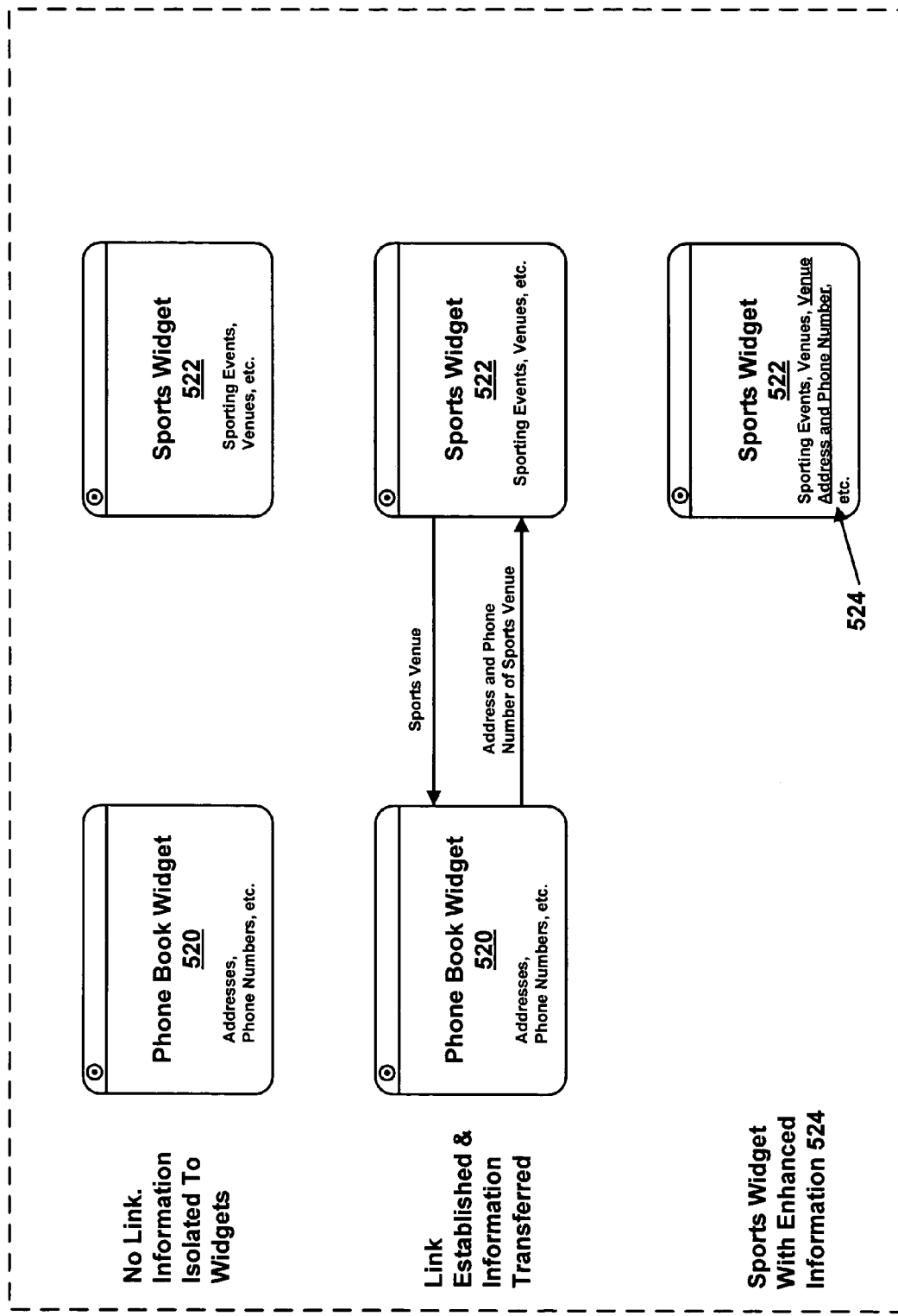
FIG. 5B illustrates the exchange of information between linked widgets.

FIG. 5B illustrates the exchange of information between linked widgets. In this example, a phone book widget 520 and a sports widget 522 are residing in a dashboard layer or user interface. The phone book widget 520 includes typical phonebook information, such as addresses and telephone numbers. The sports widget 522 includes information related to sporting events, including information related to sports venues. In this example, the sports widget 522 information does not include addresses and telephone numbers of sports venues.

When a link is manually or automatically established between the phone book widget 520 and the sports widget 522, information can be exchanged between the phone book widget 520 and the sports widget 522. For example, the sports widget 522 can send the phone book widget 520 the name of a sports venue. The phone book widget 520 can then use the name of the sport venue to look up the address and telephone number of the sports venue. Once the address and number are retrieved, the phone book widget 520 sends the address and telephone-number to the sports widget 522, where the information can be used to augment or enhance the sporting event information 524.

Automatic Widget Linking Process

Figure 6:
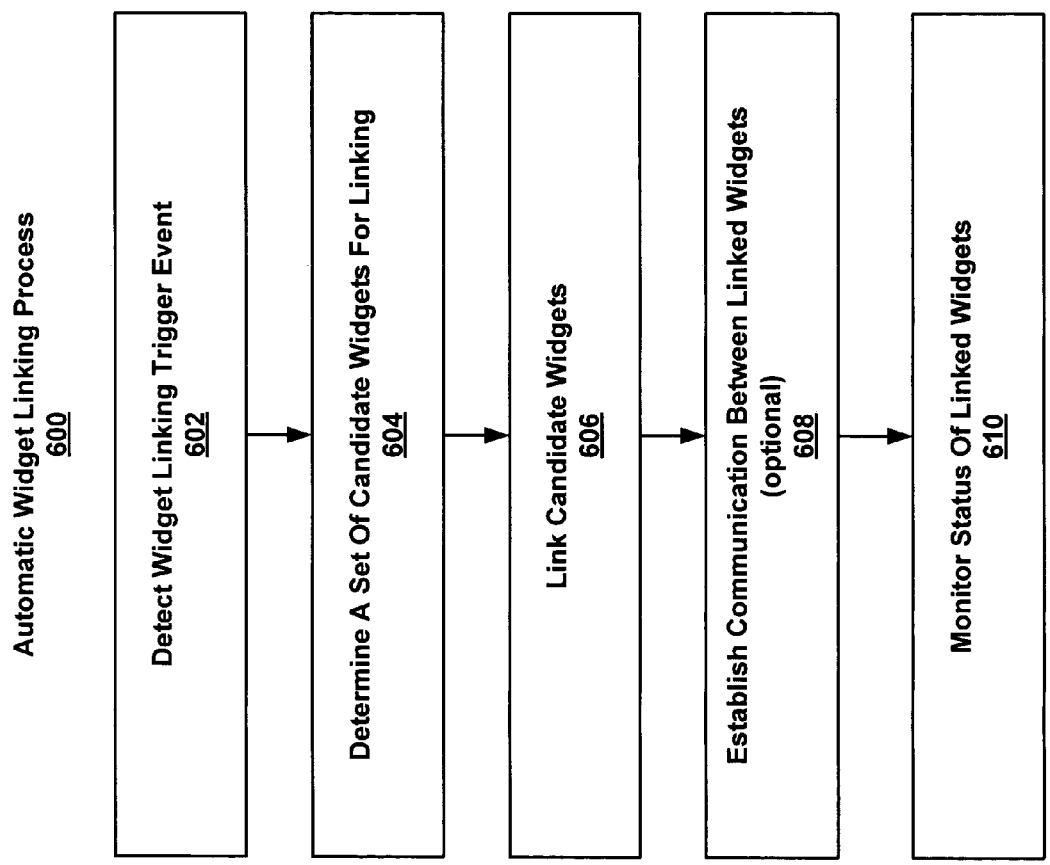
FIG. 6 is a flow diagram of an exemplary automatic widget linking process.

FIG. 6 is a flow diagram of an exemplary automatic widget linking process 600. The steps of process 600 do not necessarily have to occur in a specific order, and at least some steps can be executed in a multi-threading and/or multi-processing environment.

The process 600 begins when a widget linking trigger event is detected (602). A widget linking trigger event can generated (e.g., by a dashboard server) in response to the downloading, installation, previewing, launching, updating, manipulation, operation and/or interaction with a widget. A widget linking trigger event can also be the exercise of a feature or functionality of one or more widgets. A widget linking trigger event can be generated by user input or programmatically by software (e.g., operating system, application, etc.) or hardware (e.g., mouse click, hardware plug-in, etc.).

In response to a trigger event, the process 600 determines a set of candidate widgets that can be linked (604). Candidate widgets can be determined from predetermined or dynamically generated link information. In some implementations, predetermined link information can be stored in the dashboard configuration information 304, as shown in FIG. 3. The link information can be included by a widget's author in files associated with each widget (e.g., info.plist), or created by the user with the widget link manager, as described with respect to FIG. 8. Link information can also be dynamically created while a widget is running or not. For example, widgets that are running can be forming new links, terminating or reviving existing links, generating or receiving new data sources and the like. This dynamically generated link information can be stored during runtime in memory or other computer-readable medium (e.g., hard disk).

In some implementations, a dashboard can scan for installed widgets to create a collection of linkages, or possible linkages which are stored during runtime. In some implementations, the user can control the linkages which can be stored by the dashboard server. For example, the user can manually establish linkages using a widget link manager or bridging elements, as described with respect to FIGS. 9A and 9B.

When a set of candidate widgets is determined, the process 600 automatically links (and installs and launches, if necessary) the candidate widgets (606). In some implementations a manual step can be used in combination with the process 600 by automatically presenting a user interface that includes a list of candidate widgets that can be linked to a particular widget (e.g., the widget that generated the trigger event). The candidate widgets can be organized into a file system that can be navigated. For example, launched widgets that are running on the host device can be listed separately from widgets that are residing on the host device but have not been launched.

The user can manually select one or more widgets from the candidate widget list for linking. In other embodiments, a link or other mechanism can be provided in the dashboard layer and/or in a configuration bar that the user can select to invoke the user interface having candidate widgets and/or to direct the user to another source of candidate widgets (e.g., a link to a website).

In some implementations, a communication channel is established between the linked widgets using known object oriented programming (OOP) techniques and languages (e.g., Java, C++, Smalltalk, etc.) for transmitting and receiving messages (608). In some implementations, each widget in a linked pair of widgets can "pull" information from the other widget, "push" information to the other widget, or both (i.e., bidirectional communication). In other implementations, each widget writes information to a shared memory or storage location (e.g., local storage 106) where it can be read by other widgets. The type and amount of information shared is dependent on the needs of the widgets that are linked. An examples of shared link information would be the coordinate or location data between the widgets 508, 510 and 512, as described with respect to FIG. 5A.

In some implementations, the widgets share security information (e.g., keys, secret data, etc.) for secured communications. When widgets share information, there is a danger that malicious widgets will gain access to restricted information. If confidential information is to be shared between widgets, then the widgets can be signed and undergo an authentication procedure during linking using one or more known authentication techniques (e.g., Digital Signature Algorithm (DSA)).

When communication between linked widgets is established, the process 600 monitors the link status (610) for changes. Changes could be failed links, temporarily disable links, new links, etc. The process 600 detects any changes and modifies the link information as appropriate. For example, if a new link is established the process 600 will add the link to the link information associated with the widgets forming the link, as described with respect to Table I.

Software Architecture for Linking Widgets

Figure 7:
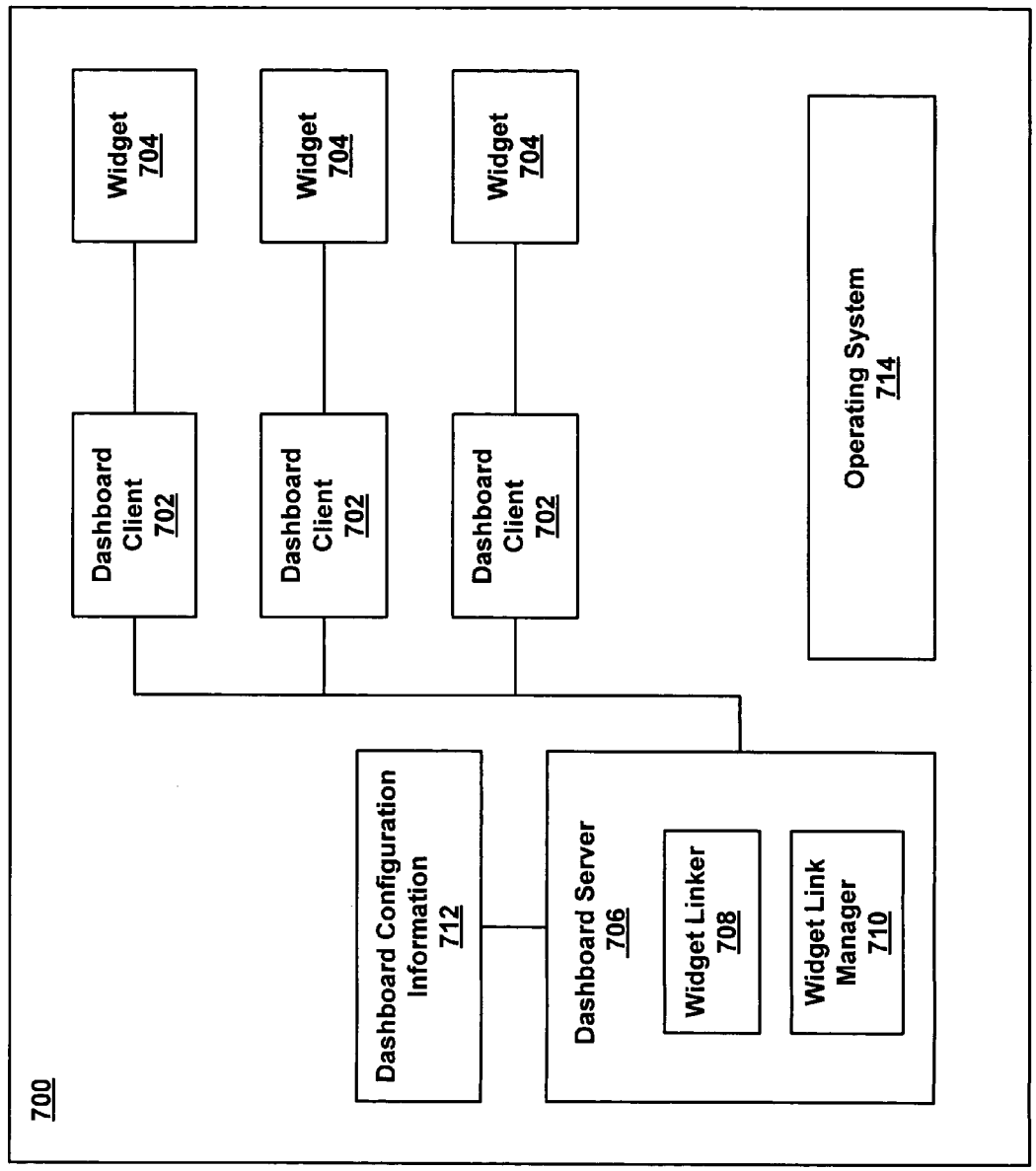
FIG. 7 is a block diagram of an implementation of a software architecture for linked widgets.

FIG. 7 is a block diagram of an implementation of a software architecture for linking widgets. The software architecture 700 is similar to the architecture described with respect to FIG. 3. However, the dashboard server 706 includes a widget linker 708 and a widget link manager 710. The widget link manager 710 is described with respect to FIG. 8. The software architecture 700 is exemplary and other architectures can be realized having more or fewer components and/or processes. For example, the widget linker 708 and widget link manager 710 can be independent or stand-alone applications, processes, components, or services that can operate independent of the dashboard server 706, including as an operating system component or plug-in. The software architecture 700 can include dashboard configuration information 712 and an operating system 714.

The widget linker 708 is responsible for implementing the process 600, as described with respect to FIG. 6. In some implementations, the widget linker 708 monitors the downloading, installation, previewing and launching of widgets and detects trigger events for linking In response to a trigger event, the widget linker 708 can match a unique widget identifier (e.g., a hash) for the trigger widget with a list of candidate widgets that can be linked to the triggering widget ("candidate link widgets"). In some implementations, the widget linker 708 can store and maintain a link flag or link key for each candidate link widget, together with a memory address for accessing shared information. Setting the flag will cause the widget to read information from the address provided by the widget linker 708. The widget linker 708 will also install and/or launch the candidate linked widgets (widgets with set link flags), if the candidate link widgets have not been installed and/or launched. An example data structure for linked widgets is show in Table I below.

TABLE I

Data Structure For Link Information

| Widget Name | Widget ID | Linked To: | Sharing: | Link Flag |
| --- | --- | --- | --- | --- |
| Search | ID1 | ID2, ID3, . . . | location, . . . | On |
| Map | ID2 | ID1, ID3 . . . | None. | On |
| Weather | ID3 | ID1, ID2 . . . | None. | On |
| Other Widgets | . . . | . . . | . . . | . . . |

Referring to Table I, an exemplary data structure includes a Name field, a Widget ID field, a Linked To field and a Sharing field. More or fewer fields can be used, as desired. The Name field stores the name of the widget, the Widget ID field stores a unique ID for the widget (e.g., a fingerprint or hash), the Linked To field includes the Widget IDs for all the widgets that are linked to the widget identified in the Name and Widget ID fields. The Sharing field includes a description of information to be shared by the widget having the Widget ID. The data structure can be stored as a text file in a directory where it can be edited by a user through, for example, a text editor.

In some implementations, the widget linker 708 keeps track of the physical and/or logical address locations of shared information, the types of data that can be shared and the widgets that are allowed to share data. In some implementations, the user or a system administrator can prevent a widget from sharing its data with any other widget (e.g., as a security precaution) by setting the "sharing" field to None. Content feeds and other external information sources can be similarly protected. In some implementations, some widget data can be shared and other widget data can remain private. Such an implementation can be realized by adding one or more additional fields in the data structure shown in Table I. For example, one or more fields can be added that list the source of a trigger event or that stores instantaneous IDs for multiple instances of widgets.

Manual Widget Linking Process

FIG. 8 is a flow diagram of an implementation of a manual widget linking process 800. The steps of process 800 do not necessarily have to occur in a specific order, and at least some steps can be executed in a multi-threading and/or multi-processing environment.

The process 800 begins when the user selects a first widget for linking (802). In some implementations, the first widget includes a linking mechanism (e.g., menu item, button) which, when selected (e.g., mouse clicked), configures the widget for linking with other widgets, and invokes a widget link manager for manually establishing links with other widgets. In other implementations, the widget flips when the linking mechanism is selected, and a widget link manager user interface is presented on the backside of the widget. An example of a user interface for a widget link manager is described with respect to FIG. 9A.

After the first widget is selected, the user can select information belonging to the first widget which can be shared with other widgets. In some cases, the user may desire to keep certain widget information private but allow other widget information to be made public (i.e., shared with other widgets). In some cases, there may be restrictions on the number and types of widgets that can be linked to the first widget. For example, widgets that have access to certain local or network resources (e.g., file systems, private information, etc.) may be restricted by the user (or the user's privileges) from linking with other widgets for security reasons. For example, a user can turn off automatic widget linking for all or some widgets, or restrict certain widgets from linking with certain other widgets. Such restrictions or any other security methods can be specified or set by a user or administrator through a security preference pane or other input mechanism. These restrictions can be placed in a widget file that is distributed with the widget (e.g., info.plist) or added at a later time by a system administrator or user through a widget manager, as described with respect to FIG. 9A.

The user selects a second widget for linking with the first widget (804). The user can also select information belonging to the second widget which can be shared with the first widget. Once the first and second widgets are specified, including a specification of shared data, the widgets can be linked (806).

Manually Linking Widgets Using a Widget Link Manager

Figure 9A:
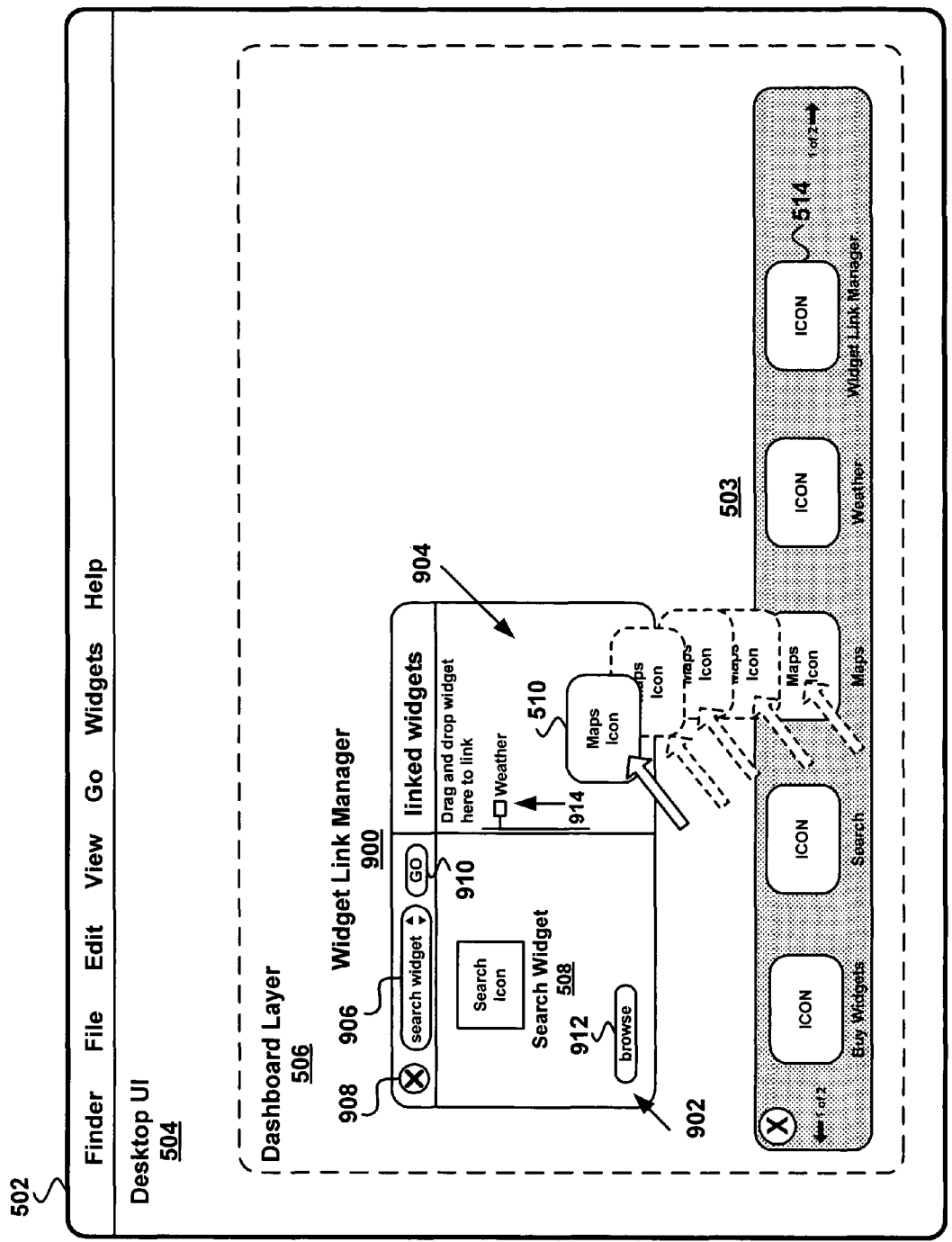
FIG. 9A is a screen shot depicting the manual linking of widgets using an exemplary widget link manager.

FIG. 9A is a screen shot depicting the manual linking of widgets using an exemplary widget link manager 900. The widget link manager 900 can be a stand-alone application, an operating system component or plug-in or a widget. The functionality of the widget link manager 900 will now be described in reference to the exemplary search, map and weather widgets 508, 510 and 512. It should be appreciated that the widget link manager 900 can operate on any number or type of widgets and is not limited to the widgets disclosed.

In some implementations, the widget link manager 900 is invoked by clicking on the widget link manager icon 514 or other input mechanism (e.g., key combination, menu option, etc.). The widget link manager 900 can be closed by clicking the button 908 or other input mechanism. When invoked the widget link manager provides a display area including a search panel 902 and a link panel 904. The search panel 902 includes a search box 906 for searching for widgets and a browse button 912. For example, a user can put name of a widget in the search box 906 and click a "Go" button 910 to run a search for the search widget 508. Alternatively, the user can browse a directory structure for widgets, using techniques commonly employed by file systems to search for files (e.g., Mac OS® Finder or Spotlight).

When the search widget 508 is selected its icon or other identifier can be displayed in the search area 902. To link the search widget 508 with the map widget 510, the user can, for example, drag the icon for the map widget 510 from the configuration bar 503 and drops the icon in the link area 904. In some implementations, the widget link manager 900 determines whether the map widget 510 can be linked to the search widget 508 by, for example, examining link information for the widgets. If the map widget 510 can be linked, the map widget 510 can appear in a list 914 of linked widgets in the link area 904. If the map widget 510 cannot be linked to the search widget 508, the map widget 510 is not displayed in the list 914 and the user is notified (e.g., by an alert message). A link failure could occur if the map and search widgets 508, 510, are restricted from being linked to each other, or if there is insufficient link information available for one or both widgets, or for any other reason (e.g., security restrictions). Note that the link information shared is dependant on the widgets that are linked. For example, the search, map and weather widgets would share location information (e.g., address, latitude, longitude, etc.).

It should be apparent that other implementations of the widget link manager 900 are possible. For example, all or part of the functionality of the widget link manager 900 can be accessible on the flip-side of a widget. If a user wants to link widgets, the user can flip the widget to display the search area 902 and link area 904.

Manually Linking Widgets Using Bridging Elements

Figure 9B:
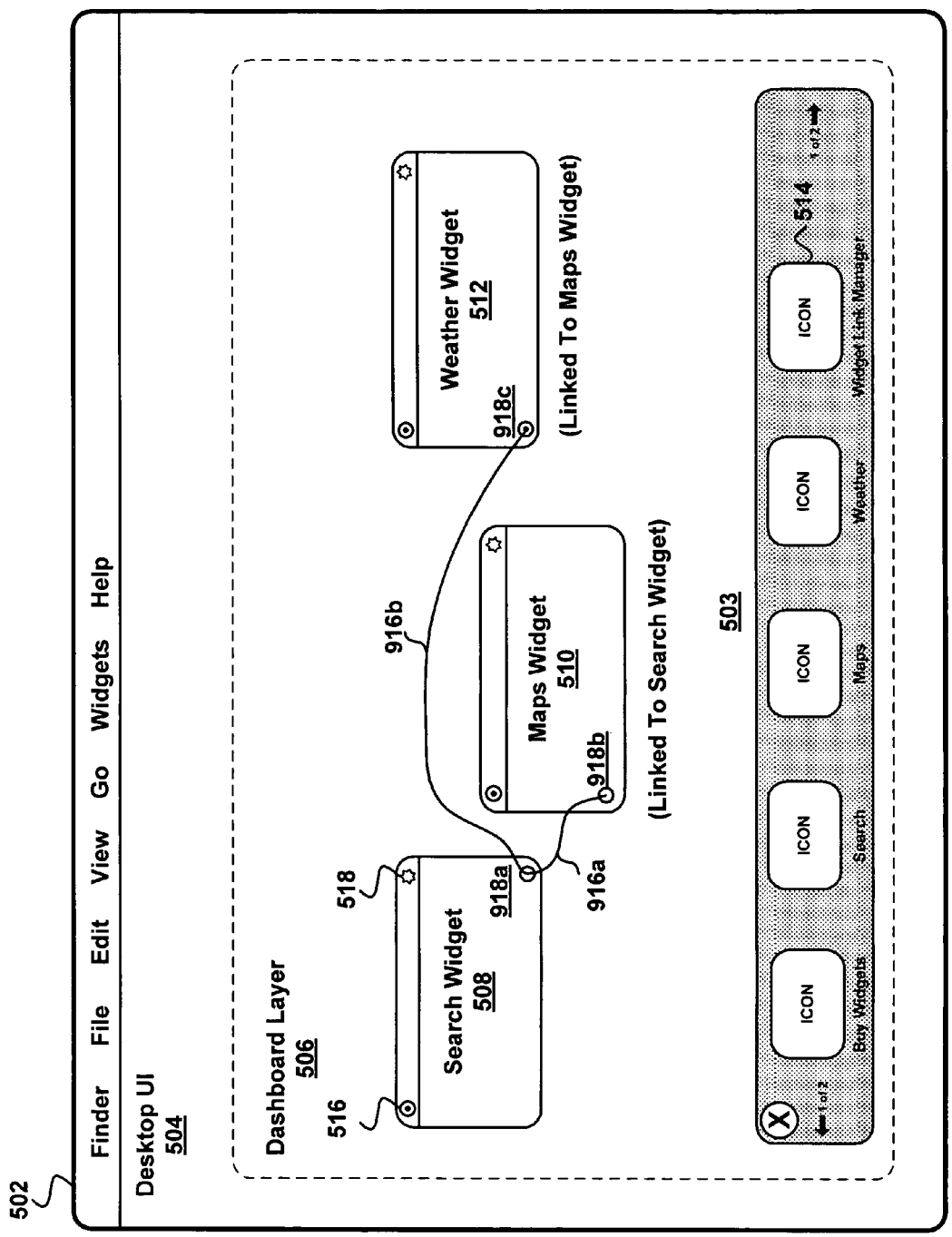
FIG. 9B is a screen shot depicting the manual linking of widgets using bridging elements.

FIG. 9B is a screen shot depicting the manual linking of widgets 508, 510 and 512 using bridging elements 916. Bridging elements are objects that can be used to visually connect two or more objects in a user interface. For example, a user can select or click on a dock 918a located on widget 508 to grab hold of a first bridging element 916a. The user can then click and drag the first bridging element 916a to a dock 918b located on widget 510. In this example, the first bridging element 916a is shown as a solid line, but other bridging elements are possible (e.g., a dashed line). In some implementations, the user can grab the first bridging element 916a by clicking a mouse button and holding the button down while dragging the end of the first bridging element 916a to the dock 918b. In some implementations, the user clicks on the docks 918a and 918b and a bridging element 916a is automatically displayed between the two docks 918a and 918b.

When the end of the first bridging element 916a is over or in the proximity of the dock 918b, the user releases the mouse button and the bridge between the widgets 508 and 510 is completed, resulting in the widgets 508 and 510 being linked. The user can repeat the same procedure using a second bridging element 916b and docks 918a and 918c. In some implementations, the bridging element is displayed until the widgets are linked at which time is removed or otherwise obfuscated. For example, once the widgets have been bridged, the bridging element can disappear or be obfuscated and the widget's properties or characteristics can be altered to indicate link status (e.g., the widgets change color).

In some implementations, the widgets can be unlinked by clicking on each widget of a link, which causes the bridging element to be displayed again. The user can then manually "snip" the bridging element by clicking on it with a mouse or other pointing device. Other techniques for removing links using bridging elements are possible.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method of linking widgets, comprising:
    generating a dashboard layer, where the dashboard layer is at least partially overlaid on an existing user interface;
    installing, in the dashboard layer, a first widget;
    installing, in the dashboard layer, a second widget, wherein the first widget and the second widget are separate applications; and
    determining the first widget and the second widget are associated based on predefined criteria; in response to the determination, automatically linking the first and second widgets, the linking including
    changing a visual appearance or positions of the first and second widgets in the dashboard layer to indicate the widgets are linked and the strength of the link, wherein the method is performed by one or more hardware processors.

2. The method of claim 1, where installing the second widget in the dashboard layer, comprises:
detecting a trigger event associated with the first widget;
responsive to the trigger event,
searching a list of contextually relevant widgets;
selecting the second widget from the list; and
installing the second widget in the dashboard layer.

3. The method of claim 2, wherein the list is a data structure of link information, including a field for indicating shared information.

4. The method of claim 1, comprising:
displaying the second widget in the dashboard layer; and
allowing interaction with the second widget.

5. The method of claim 1, wherein the predefined criteria includes a type of data or information the widgets use or share.

6. The method of claim 1, wherein the predefined criteria includes an origin of the widgets.

7. The method of claim 1, wherein the predefined criteria includes a time of day.

8. The method of claim 1, wherein linking-comprises:
determining if the second widget is available for linking; and
automatically linking the second widget to the first widget.

9. The method of claim 1, wherein the predefined criteria includes participation in a process or workflow.

10. A tangible, non-transitory computer-readable storage medium having stored thereon instructions, which, when executed by a processor, causes the processor to perform operations comprising:
generating a dashboard layer, where the dashboard layer is at least partially overlaid on an existing user interface, such that when the dashboard is active, the existing user interface is faded to emphasize that the user interface is temporarily inactive;
installing, in the dashboard layer, a first widget;
installing, in the dashboard layer, a second widget; and
during the installing of the first or second widget, automatically linking the first and second widgets based on predefined criteria, the automatic linking including changing a visual appearance or positions of the first and second widgets in the dashboard layer to indicate the widgets are linked and the strength of the link.

11. The computer-readable medium of claim 10, comprising:
detecting a trigger event associated with the first widget;
responsive to the trigger event,
searching a list of contextually relevant widgets;
selecting the second widget from the list; and
installing the second widget in the dashboard layer.

12. The computer-readable medium of claim 11, wherein the list is a data structure of link information, including a field for indicating shared information.

13. The computer-readable medium of claim 10, comprising:
displaying the second widget in a dashboard layer; and
allowing interaction with the second widget.

14. The computer-readable medium of claim 10, where the predefined criteria includes a type of data or information the widgets use or share.

15. The computer-readable medium of claim 10, where the predefined criteria includes an origin of the widgets.

16. The computer-readable medium of claim 10, where the predefined criteria includes a time of day.

17. The computer-readable medium of claim 10, wherein linking comprises:
determining if the second widget is available for linking; and
automatically linking the second widget to the first widget.

18. The computer-readable medium of claim 10, where the predefined criteria includes participation in a process or workflow.

19. A system for linking widgets, comprising:
one or more processors;
memory coupled to the one or more processors and storing instructions that when executed by the one or more processors causes the one or more processors to perform operations comprising:
generating a dashboard layer, where the dashboard layer is at least partially overlaid on an existing user interface;
installing, in the dashboard layer, a first widget;
installing, in the dashboard layer, a second widget,
wherein the first widget and the second widget are separate applications;
determining the first widget and the second widget are associated based on predefined criteria; and
in response to the determination,
automatically linking the first and second widgets, the linking including changing a visual appearance or positions of the first and second widgets in the dashboard layer to indicate the widgets are linked and the strength of the link.

20. The system of claim 19, where installing the second widget in the dashboard layer, comprises:
detecting a trigger event associated with the first widget;
responsive to the trigger event,
searching a list of contextually relevant widgets;
selecting the second widget from the list; and
installing the second widget in the dashboard layer.

21. The system of claim 20, wherein the list is a data structure of link information, including a field for indicating shared information.

22. The system of claim 19, comprising:
displaying the second widget in a dashboard layer; and
allowing interaction with the second widget.

23. The system of claim 19, where the predefined criteria includes a type of data or information the widgets use or share.

24. The system of claim 19, where the predefined criteria includes an origin of the widgets.

25. The system of claim 19, where the predefined criteria includes a time of day.

26. The system of claim 19, wherein linking-comprises:
determining if the second widget is available for linking; and
automatically linking the second widget to the first widget.

27. The system of claim 19, where the predefined criteria includes participation in a process or workflow.

* * * * *

UNITED STATES PATENT AND TRADEMARK OFFICE
CERTIFICATE OF CORRECTION

PATENT NO. : 9,104,294 B2  
APPLICATION NO. : 11/403644  
DATED : August 11, 2015  
INVENTOR(S) : Scott Forstall et al.

Page 1 of 1

It is certified that error appears in the above-identified patent and that said Letters Patent is hereby corrected as shown below:

In the Claims

Column 19, Line 23 (claim 8); delete "linking-comprises:" and insert -- linking comprises: --, therefor.

Column 20, Line 56 (claim 26); delete "linking-comprises:" and insert -- linking comprises: --, therefor.

Signed and Sealed this
Eighth Day of March, 2016

Michelle K. Lee
*Director of the United States Patent and Trademark Office*